(12) United States Patent
Gillott

(10) Patent No.: US 11,994,641 B2
(45) Date of Patent: May 28, 2024

(54) SEISMIC DATA ACQUISITION SYSTEMS AND METHODS

(71) Applicant: Magseis FF LLC, Houston, TX (US)

(72) Inventor: Graham Gillott, Arona (IT)

(73) Assignee: Magseis FF LLC, Houston, TX (US)

( * ) Notice: Subject to any disclaimer, the term of this patent is extended or adjusted under 35 U.S.C. 154(b) by 688 days.

(21) Appl. No.: 16/551,367

(22) Filed: Aug. 26, 2019

(65) Prior Publication Data

US 2021/0063596 A1 Mar. 4, 2021

(51) Int. Cl.
| | | |
|---|---|---|
| G01V 1/38 | (2006.01) | |
| G01V 1/16 | (2006.01) | |
| G01V 1/18 | (2006.01) | |
| G01V 1/20 | (2006.01) | |

(52) U.S. Cl.
CPC ............ *G01V 1/3808* (2013.01); *G01V 1/162* (2013.01); *G01V 1/186* (2013.01); *G01V 1/201* (2013.01)

(58) Field of Classification Search
None
See application file for complete search history.

(56) References Cited

U.S. PATENT DOCUMENTS

| | | | |
|---|---|---|---|
| 4,914,636 A | 4/1990 | Garrotta | |
| 2006/0227658 A1 | 10/2006 | Toennessen et al. | |
| 2007/0230268 A1* | 10/2007 | Hoogeveen | G01S 13/46 367/19 |
| 2008/0175097 A1 | 7/2008 | Storteig et al. | |
| 2010/0170428 A1* | 7/2010 | Toennessen | G01V 1/201 114/242 |
| 2011/0286303 A1 | 11/2011 | Paull et al. | |
| 2012/0147701 A1 | 6/2012 | Ross et al. | |
| 2013/0333974 A1 | 12/2013 | Coste et al. | |
| 2016/0131778 A1 | 5/2016 | Norris | |
| 2020/0073000 A1 | 3/2020 | Rogers | |

FOREIGN PATENT DOCUMENTS

| | | |
|---|---|---|
| GB | 0001757 | 3/2000 |
| GB | 2362715 A | 11/2021 |
| WO | 2014193717 A1 | 12/2014 |
| WO | WO-2018/208168 A1 | 11/2018 |

OTHER PUBLICATIONS

International Association of Geophysical Contractors, https://www.cnlopb.ca/wp-content/uploads/mkiseislab/mki_app_b.pdf, p. 1-16 (Year: 2002).*
International Search Report and Written Opinion for PCT/US2019/050252 dated Jun. 2, 2020 (15 pages).

* cited by examiner

*Primary Examiner* — Hovhannes Baghdasaryan
(74) *Attorney, Agent, or Firm* — Sage Patent Group

(57) ABSTRACT

A seismic survey system is provided. The system can include a receiver array including a first streamer and a second streamer. The system can include a first plurality of receivers coupled with the first streamer and a second plurality of receivers coupled with the second streamer. The system can include a main source array including a first main source and a second main source. The system can include an accessory source array including a first accessory source and a second accessory source. The first accessory source can couple with the first main source and the second accessory source can couple with the second main source. The system can include a first lateral cable to couple with a first diverter and with the first main source. The system can include a second lateral cable to couple with a second diverter and with the second main source.

17 Claims, 12 Drawing Sheets

SEISMIC DATA ACQUISITION SYSTEMS AND METHODS

BACKGROUND

Seismic or other operations performed on a piece of earth can identify characteristics or features of or on the analyzed piece of earth.

SUMMARY

At least one aspect of the present disclosure is directed to a seismic survey system which can include a receiver array. The receiver array can include a first streamer and a second streamer. The seismic survey system can include a first plurality of receivers coupled with the first streamer and a second plurality of receivers coupled with the second streamer. The seismic survey system can include a main source array. The main source array can include a first main source and a second main source. The seismic survey system can include an accessory source array. The accessory source array can include a first accessory source and a second accessory source. The first accessory source can couple with the first main source and the second accessory source can couple with the second main source. The seismic survey system can include a first lateral cable to couple with a first diverter and with the first main source. The seismic survey system can include a second lateral cable to couple with a second diverter and with the second main source.

At least one aspect of the present disclosure is directed to a method of seismic surveying. The method can include providing a receiver array. The receiver array can include a first streamer and a second streamer. The method can include coupling a first plurality of receivers with the first streamer. The method can include coupling a second plurality of receivers with the second streamer. The method can include providing a main source array comprising a first main source and a second main source. The method can include providing an accessory source array. The accessory source array can include a first accessory source and a second accessory source. The first accessory source can couple with the first main source and the second accessory source can couple with the second main source. The method can include providing a first lateral cable to couple with a first diverter and with the first main source. The method can include providing a second lateral cable to couple with a second diverter and with the second main source.

At least one aspect of the present disclosure is directed to a seismic survey system which can include a main source array. The main source array can include a first main source and a second main source. The seismic survey system can include an accessory source array. The accessory source array can include a first accessory source and a second accessory source. The first accessory source can couple with the first main source and the second accessory source can couple with the second main source. The seismic survey system can include a data processing system having one or more processors. The data processing system can initiate a first source shot of the first main source. The data processing system can initiate a first source shot of the second main source. The data processing system can initiate a first source shot of the first accessory source. The data processing system can initiate a first source shot of the second accessory source.

At least one aspect of the present disclosure is directed to a method of seismic surveying. The method can include providing a main source array. The main source array can include a first main source and a second main source. The method can include providing an accessory source array. The accessory source array can include a first accessory source and a second accessory source. The first accessory source can couple with the first main source and the second accessory source can couple with the second main source. The method can include initiating, by a data processing system, a first source shot of the first main source. The method can include initiating, by the data processing system, a first source shot of the second main source. The method can include initiating, by the data processing system, a first source shot of the first accessory source. The method can include initiating, by the data processing system, a first source shot of the second accessory source.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Reflection-based surveys described herein can obtain information relating to subsurface features. An acoustic signal can reflect off subsurface lithological formations and be acquired, analyzed and interpreted. However, reflection-based surveys typically are not designed to provide information relating to subsurface features while providing information relating to objects on the seabed. For example, pipes located on the seabed may be the site of escaping fluid or gas, which could benefit from survey monitoring.

The present disclosure is directed to systems and methods for seismic surveying. With reflection-based surveys it can be challenging to detect and monitor objects on the seabed. Inefficiencies related to increased survey time, such as a greater risk of weather-based delays, can increase the operating cost of these surveys without providing an accurate map of subterranean features of the seabed in addition to objects located on the seabed. Systems and methods of the present disclosure can solve these and other problems associated with performing a survey to detect subterranean features of the seabed in addition to monitoring objects located on the seabed.

For example, the seismic survey system can monitor objects on the seabed. The system can include a receiver array. The receiver array can include a first streamer and a second streamer. The seismic survey system can include a first plurality of receivers coupled with the first streamer and a second plurality of receivers coupled with the second streamer. The seismic survey system can include a main source array. The main source array can include a first main source and a second main source. The seismic survey system can include an accessory source array. The accessory source array can include a first accessory source and a second accessory source. The first accessory source can couple with the first main source and the second accessory source can couple with the second main source. The seismic survey system can include a first lateral cable to couple with a first diverter and with the first main source. The seismic survey system can include a second lateral cable to couple with a second diverter and with the second main source.

Figure 1:
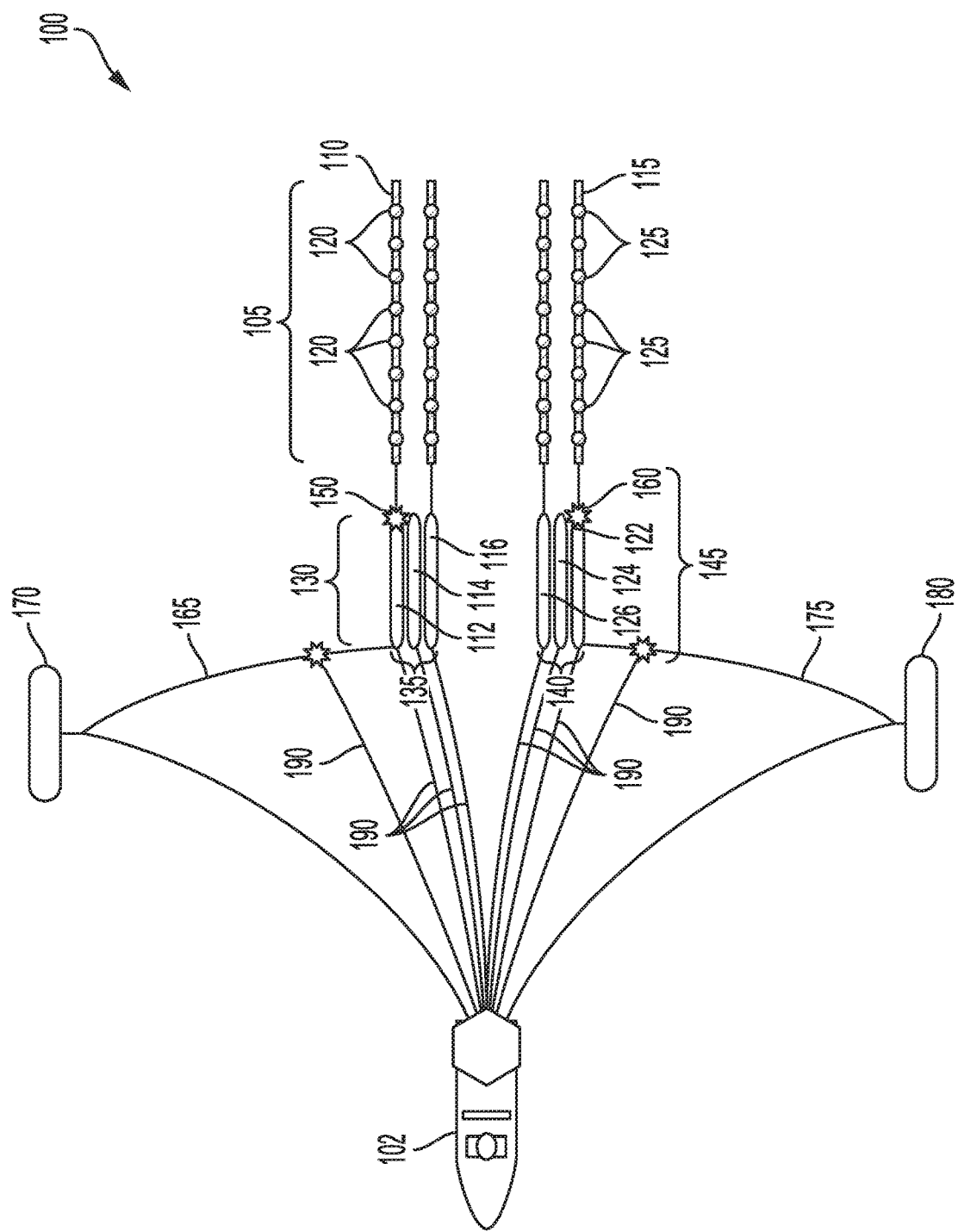
FIG. 1 illustrates a seismic survey system according to an example implementation.

FIG. 1 illustrates an example seismic survey system 100 illustrative of a marine environment in which the systems and methods of the present disclosure can perform a seismic survey to detect seabed objects. The seismic survey system 100 can include a receiver array 105. The receiver array 105 can include a first streamer 110. The receiver array 105 can include a second streamer 115. The first streamer 110 may be a cable (e.g., a surface marine cable), an assembly of wires, or any component capable of connecting a receiver to a recording device which may be located on a vessel 102. The second streamer 115 may be a cable (e.g., a surface marine cable), an assembly of wires, or any component capable of connecting a receiver to a recording device which may be located on a vessel 102.

The seismic survey system 100 can include a first plurality of receivers 120. The first plurality of receivers 120 can be coupled with the first streamer 110. The first plurality of receivers 120 can be disposed on the first streamer 110. The first plurality of receivers 120 can be coupled to the first streamer 110 along a line. The first plurality of receivers 120 can be evenly spaced along the first streamer 110. The first plurality of receivers 120 can receive reflection data reflected off an object in a seabed. For example, a receiver of the first plurality of receivers 120 may be a hydrophone or any other device capable of collecting seismic data. Seismic data can include reflection data indicating subsurface features of the seabed. Seismic data can include reflection data indicating features on the seabed. The first plurality of receivers 120 can be configured to detect acoustic waves that are reflected by seabed objects. The seabed objects can be completely buried within the seabed. The seabed objects can be partially buried within the seabed. The first plurality of receivers 120 can receive reflection data indicating fluid escape from pipes on or below the seabed. The first plurality of receivers 120 can receive reflection data indicating gas escape from pipes on or below the seabed.

The seismic survey system 100 can include a second plurality of receivers 125. The second plurality of receivers 125 can be coupled with the second streamer 115. The second plurality of receivers 125 can be disposed on the second streamer 115. The second plurality of receivers 125 can be coupled to the second streamer 115 along a line. The second plurality of receivers 125 can be evenly spaced along the second streamer 115. The second plurality of receivers 125 can receive reflection data reflected off an object in a seabed. For example, a receiver of the second plurality of receivers 125 may be a hydrophone or any other device capable of collecting seismic data. Seismic data can include reflection data indicating subsurface features of the seabed. Seismic data can include reflection data indicating features on the seabed. The second plurality of receivers 125 can be configured to detect acoustic waves that are reflected by seabed objects. The seabed objects can be completely buried within the seabed. The seabed objects can be partially buried within the seabed. The second plurality of receivers 125 can receive reflection data indicating fluid escape from pipes on or below the seabed. The second plurality of receivers 125 can receive reflection data indicating gas escape from pipes on or below the seabed.

The seismic survey system 100 can include a main source array 130. The main source array 130 can generate an acoustic signal to be received by the receiver array 105. The main source array 130 can generate low frequency waves (e.g., 50 Hz). The main source array 130 can include a first main source 135. The first main source 135 can generate a source shot. The first main source 135 can be an electrical source. The first main source 135 can be an acoustic source. The first main source 135 can generate acoustic waves. The first main source 135 can generate an acoustic signal to be received by the receiver array 105. The first main source 135 can generate low frequency waves (e.g., 50 Hz). The main source array 130 can include a second main source 140. The second main source 140 can generate a source shot. The second main source 140 can be an electrical source. The second main source 140 can be an acoustic source. The second main source 140 can generate acoustic waves. The second main source 140 can generate an acoustic signal to be received by the receiver array 105. The second main source 140 can generate low frequency waves (e.g., 50 Hz).

The first main source 135 can include a first float of the first main source 112. The first float of the first main source 112 can include a plurality of air guns. The plurality of air guns can be coupled to the first float of the first main source 112. The plurality of air guns can be coupled to the first float of the first main source 112 by a plurality of gun chains. The first float of the first main source 112 can be coupled to the receiver array 105. The first float of the first main source 112 can be coupled to the vessel 102. The first float of the first main source 112 can be coupled to the vessel 102 by a gun string. The first float of the first main source 112 can include a plurality of gun plates. The plurality of air guns can be coupled to the plurality of gun plates. The first streamer 110 can couple with the first float of the first main source 112.

The first main source 135 can include a second float of the first main source 114. The second float of the first main source 114 can include a plurality of air guns. The plurality of air guns can be coupled to the second float of the first main source 114. The plurality of air guns can be coupled to the second float of the first main source 114 by a plurality of gun chains. The second float of the first main source 114 can be coupled to the receiver array 105. The second float of the first main source 114 can be coupled to the vessel 102. The second float of the first main source 114 can be coupled to the vessel 102 by a gun string. The second float of the first main source 114 can include a plurality of gun plates. The plurality of air guns can be coupled to the plurality of gun plates. The first streamer 110 can couple with the second float of the first main source 114.

The first main source 135 can include a third float of the first main source 116. The third float of the first main source 116 can include a plurality of air guns. The plurality of air guns can be coupled to the third float of the first main source 116. The plurality of air guns can be coupled to the third float of the first main source 116 by a plurality of gun chains. The third float of the first main source 116 can be coupled to the receiver array 105. The third float of the first main source 116 can be coupled to the vessel 102. The third float of the first main source 116 can be coupled to the vessel 102 by a gun string. The third float of the first main source 116 can include a plurality of gun plates. The plurality of air guns can be coupled to the plurality of gun plates. The first streamer 110 can couple with the third float of the first main source 116.

The second main source 140 can include a first float of the second main source 122. The first float of the second main source 122 can include a plurality of air guns. The plurality of air guns can be coupled to the first float of the second main source 122. The plurality of air guns can be coupled to the first float of the second main source 122 by a plurality of gun chains. The first float of the second main source 122 can be coupled to the receiver array 105. The first float of the second main source 122 can be coupled to the vessel 102. The first float of the second main source 122 can be coupled to the vessel 102 by a gun string. The first float of the second main source 122 can include a plurality of gun plates. The plurality of air guns can be coupled to the plurality of gun plates. The second streamer 115 can couple with the first float of the second main source 122.

The second main source 140 can include a second float of the second main source 124. The second float of the second main source 124 can include a plurality of air guns. The plurality of air guns can be coupled to the second float of the second main source 124. The plurality of air guns can be coupled to the second float of the second main source 124 by a plurality of gun chains. The second float of the second main source 124 can be coupled to the receiver array 105. The second float of the second main source 124 can be coupled to the vessel 102. The second float of the second main source 124 can be coupled to the vessel 102 by a gun string. The second float of the second main source 124 can include a plurality of gun plates. The plurality of air guns can be coupled to the plurality of gun plates. The second float of the second main source 124.

The second main source 140 can include a third float of the second main source 126. The third float of the second main source 126 can include a plurality of air guns. The plurality of air guns can be coupled to the third float of the second main source 126. The plurality of air guns can be coupled to the third float of the second main source 126 by a plurality of gun chains. The third float of the second main source 126 can be coupled to the receiver array 105. The third float of the second main source 126 can be coupled to the vessel 102. The third float of the second main source 126 can be coupled to the vessel 102 by a gun string. The third float of the second main source 126 can include a plurality of gun plates. The plurality of air guns can be coupled to the plurality of gun plates. The second streamer 115 can couple with the third float of the second main source 126.

The seismic survey system 100 can include an accessory source array 145. The accessory source array 145 can generate an acoustic signal to be received by the receiver array 105. The accessory source array 145 can generate high frequency waves (e.g., greater than 1000 Hz, greater than 1500 Hz). The accessory source array 145 can generate waves at a different frequency than wave generated by the main source array 130. For example, the accessory source array 145 can generate waves at a higher frequency than the frequency of the waves generated by the main source array 130. The accessory source array 145 can generate waves at a lower frequency than the frequency of the waves generated by the main source array 130. The accessory source array 145 can include a first accessory source 150 and a second accessory source 160.

The first accessory source 150 can couple with the first main source 135. The first accessory source 150 can be coupled with the main source array 130. The first accessory source 150 can be directly coupled with the main source array 130. For example, the first accessory source 150 can be mounted on the first main source 135. The first accessory source 150 can be removably attached to the first main source 135. The first accessory source 150 can be indirectly coupled with the main source array 130. For example, the first accessory source 150 can be coupled to the main source array 130 via a first lateral cable 165. The first accessory source 150 can be coupled with the first float of the first main source 112. The first accessory source 150 can be coupled with the second float of the first main source 114. The first accessory source 150 can be coupled with the third float of the first main source 116. The first accessory source 150 can be coupled with the first float of the second main source 122. The first accessory source 150 can be coupled with the second float of the second main source 124. The first accessory source 150 can be coupled with the third float of the second main source 126.

The first accessory source 150 can generate a source shot. The first accessory source 150 can generate acoustic waves. The first accessory source 150 can generate an acoustic signal to be received by the receiver array 105. The first accessory source 150 can generate high frequency waves (e.g., greater than 1000 Hz, greater than 1500 Hz). The first accessory source 150 can generate waves at a higher frequency than the frequency of the waves generated by the main source array 130. For example, the first accessory source 150 can generate waves at a higher frequency than the frequency of the waves generated by the first main source 135. The first accessory source 150 can generate waves at a higher frequency than the frequency of the waves generated by the second main source 140. The first accessory source 150 can generate waves at a lower frequency than the frequency of the waves generated by the main source array 130. For example, the first accessory source 150 can generate waves at a lower frequency than the frequency of the waves generated by the first main source 135. The first accessory source 150 can generate waves at a lower frequency than the frequency of the waves generated by the second main source 140.

The second accessory source 160 can couple with the second main source 140. The second accessory source 160 can be coupled with the main source array 130. The second accessory source 160 can be directly coupled with the main source array 130. For example, the second accessory source 160 can be mounted on the second main source 140. The second accessory source 160 can be removably attached to the second main source 140. The second accessory source 160 can be indirectly coupled with the main source array 130. For example, the second accessory source 160 can be coupled to the main source array 130 via a second lateral cable 175. The second accessory source 160 can be coupled with the first float of the first main source 112. The second accessory source 160 can be coupled with the second float of the first main source 114. The second accessory source 160 can be coupled with the third float of the first main source 116. The second accessory source 160 can be coupled with the first float of the second main source 122. The second accessory source 160 can be coupled with the second float of the second main source 124. The second accessory source 160 can be coupled with the third float of the second main source 126.

The second accessory source 160 can generate a source shot. The second accessory source 160 can generate acoustic waves. The second accessory source 160 can generate an acoustic signal to be received by the receiver array 105. The second accessory source 160 can generate high frequency waves (e.g., greater than 1000 Hz, greater than 1500 Hz). The second accessory source 160 can generate waves at a higher frequency than the frequency of the waves generated by the main source array 130. For example, the second accessory source 160 can generate waves at a higher frequency than the frequency of the waves generated by the first main source 135. The second accessory source 160 can generate waves at a higher frequency than the frequency of the waves generated by the second main source 140. The second accessory source 160 can generate waves at a lower frequency than the frequency of the waves generated by the main source array 130. For example, the second accessory source 160 can generate waves at a lower frequency than the frequency of the waves generated by the first main source 135. The second accessory source 160 can generate waves at a lower frequency than the frequency of the waves generated by the second main source 140.

The seismic survey system 100 can include a first lateral cable 165. The first lateral cable 165 can couple with a first diverter 170. The first lateral cable 165 can couple with the first main source 135. The first lateral cable 165 may be a cable (e.g., a surface marine cable), an assembly of wires, a tether, or a rope. The first lateral cable 165 can couple to the first diverter 170 through a secondary cable. The first lateral cable 165 may be a power cable to transmit electrical power from the vessel 102 to the first main source 135.

The first diverter 170 may be a diverter, a paravane or deflecting plate that redirects the motion of water past the diverter laterally to produce an amount of lateral force. The diverter can be configured to redirect flow of water past the diverter with respect to a direction of motion of the diverter through water. The diverter can include a steering device associated with the diverter. The steering device can redirect the flow of water to control an amount of lateral force generated by the diverter.

The seismic survey system 100 can include a second lateral cable 175. The second lateral cable 175 can couple with a second diverter 180. The second lateral cable 175 can couple with the second main source 140. The second lateral cable 175 may be a cable (e.g., a surface marine cable), an assembly of wires, a tether, or a rope. The second lateral cable 175 can couple to the second diverter 180 through a secondary cable. The second lateral cable 175 may be a power cable to transmit electrical power from the vessel 102 to the second main source 140.

The second diverter 180 can be or include a diverter, a paravane or deflecting plate that redirects the motion of water past the diverter laterally to produce an amount of lateral force. The diverter can be configured to redirect flow of water past the diverter with respect to a direction of motion of the diverter through water. The diverter can include a steering device associated with the diverter. The steering device can redirect the flow of water to control an amount of lateral force generated by the diverter.

The seismic survey system 100 can include a power cable 190. The power cable 190 can provide power to the main source array 130. For example, the power cable 190 may be a power cable to transmit electrical power from the vessel 102 to the main source array 130. The power cable 190 may be a power cable to transmit electrical power from the first lateral cable 165 to the main source array 130. The power cable 190 can provide power to the accessory source array 145. For example, the power cable 190 may be a power cable to transmit electrical power from the vessel 102 to the accessory source array 145. The power cable 190 may be a power cable to transmit electrical power from the first lateral cable 165 to the accessory source array 145. The power cable 190 may be multiple power cables.

Figure 2:
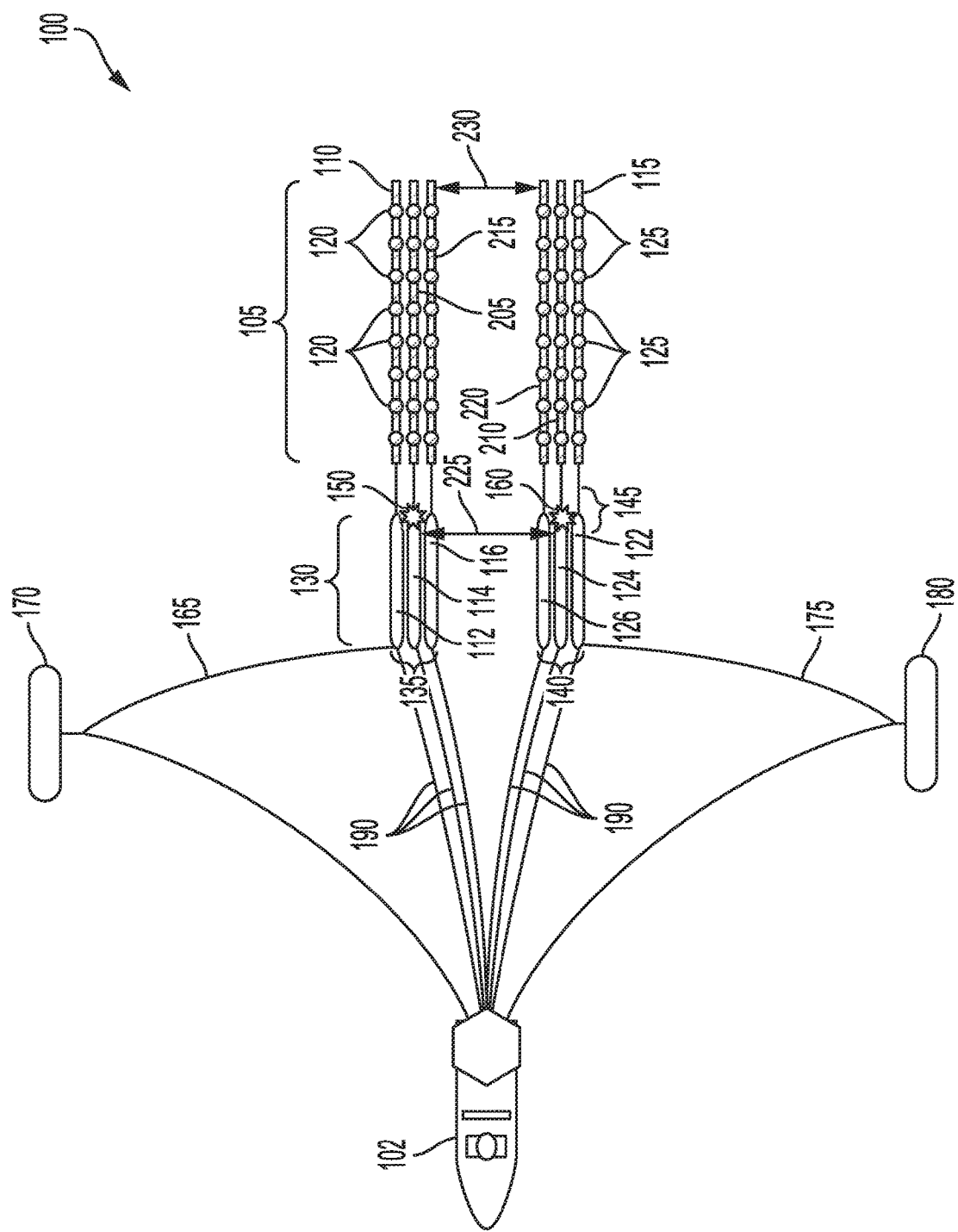
FIG. 2 illustrates a seismic survey system according to an example implementation.

FIG. 2 illustrates an example seismic survey system 100. The seismic survey system 100 can include a receiver array 105. The receiver array 105 can include a first streamer 110. The receiver array 105 can include a second streamer 115. The receiver array 105 can include a third streamer 205. The receiver array 105 can include a fourth streamer 210. The receiver array 105 can include a fifth streamer 215. The receiver array 105 can include a sixth streamer 220. The first streamer 110 may be a cable (e.g., a surface marine cable), an assembly of wires, or any component capable of connecting a receiver to a recording device which may be located on a vessel 102. The second streamer 115 may be a cable (e.g., a surface marine cable), an assembly of wires, or any component capable of connecting a receiver to a recording device which may be located on a vessel 102. The third streamer 205 may be a cable (e.g., a surface marine cable), an assembly of wires, or any component capable of connecting a receiver to a recording device which may be located on a vessel 102. The fourth streamer 210 may be a cable (e.g., a surface marine cable), an assembly of wires, or any component capable of connecting a receiver to a recording device which may be located on a vessel 102. The fifth streamer 215 may be a cable (e.g., a surface marine cable), an assembly of wires, or any component capable of connecting a receiver to a recording device which may be located on a vessel 102. The sixth streamer 220 may be a cable (e.g., a surface marine cable), an assembly of wires, or any component capable of connecting a receiver to a recording device which may be located on a vessel 102.

The seismic survey system 100 can include a first plurality of receivers 120. The first plurality of receivers 120 can be coupled with the first streamer 110. The first plurality of receivers 120 can be disposed on the first streamer 110. The first plurality of receivers 120 can be coupled to the first streamer 110 along a line. The first plurality of receivers 120 can be evenly spaced along the first streamer 110. The first plurality of receivers 120 can receive reflection data reflected off an object in a seabed. For example, a receiver of the first plurality of receivers 120 may be a hydrophone or any other device capable of collecting seismic data. Seismic data can include reflection data indicating subsurface features of the seabed. Seismic data can include reflection data indicating features on the seabed. The first plurality of receivers 120 can be configured to detect acoustic waves that are reflected by seabed objects. The seabed objects can be completely buried within the seabed. The seabed objects can be partially buried within the seabed. The first plurality of receivers 120 can receive reflection data indicating fluid escape from pipes on or below the seabed. The first plurality of receivers 120 can receive reflection data indicating gas escape from pipes on or below the seabed.

The seismic survey system 100 can include a second plurality of receivers 125. The second plurality of receivers 125 can be coupled with the second streamer 115. The second plurality of receivers 125 can be disposed on the second streamer 115. The second plurality of receivers 125 can be coupled to the second streamer 115 along a line. The second plurality of receivers 125 can be evenly spaced along the second streamer 115. The second plurality of receivers 125 can receive reflection data reflected off an object in a seabed. For example, a receiver of the second plurality of receivers 125 may be a hydrophone or any other device capable of collecting seismic data. Seismic data can include reflection data indicating subsurface features of the seabed. Seismic data can include reflection data indicating features on the seabed. The second plurality of receivers 125 can be configured to detect acoustic waves that are reflected by seabed objects. The seabed objects can be completely buried within the seabed. The seabed objects can be partially buried within the seabed. The second plurality of receivers 125 can receive reflection data indicating fluid escape from pipes on or below the seabed. The second plurality of receivers 125 can receive reflection data indicating gas escape from pipes on or below the seabed.

The seismic survey system 100 can include a main source array 130. The main source array 130 can generate an acoustic signal to be received by the receiver array 105. The main source array 130 can generate low frequency waves (e.g., 50 Hz). The main source array 130 can include a first main source 135. The first main source 135 can generate a source shot. The first main source 135 can be an electrical source. The first main source 135 can be an acoustic source. The first main source 135 can generate acoustic waves. The first main source 135 can generate an acoustic signal to be received by the receiver array 105. The first main source 135 can generate low frequency waves (e.g., 50 Hz). The main source array 130 can include a second main source 140. The second main source 140 can generate a source shot. The second main source 140 can generate a source shot. The second main source 140 can be an electrical source. The second main source 140 can be an acoustic source. The second main source 140 can generate acoustic waves. The second main source 140 can generate an acoustic signal to be received by the receiver array 105. The second main source 140 can generate low frequency waves (e.g., 50 Hz). The distance 225 between the first main source 135 and the second main source 140 can be between 40 and 60 meters. For example, the distance 225 between the first main source 135 and the second main source 140 can be 50 meters.

The first streamer 110 can couple with the first float of first main source 112. The first float of the first main source 112 can include a plurality of air guns. The plurality of air guns can be coupled to the first float of the first main source 112. The plurality of air guns can be coupled to the first float of the first main source 112 by a plurality of gun chains. The first float of the first main source 112 can be coupled to the receiver array 105. The first float of the first main source 112 can be coupled to the vessel 102. The first float of the first main source 112 can be coupled to the vessel 102 by a gun string. The first float of the first main source 112 can include a plurality of gun plates. The plurality of air guns can be coupled to the plurality of gun plates.

The second streamer 115 can couple with the first float of the second main source 122. The first float of the second main source 122 can include a plurality of air guns. The plurality of air guns can be coupled to the first float of the second main source 122. The plurality of air guns can be coupled to the first float of the second main source 122 by a plurality of gun chains. The first float of the second main source 122 can be coupled to the receiver array 105. The first float of the second main source 122 can be coupled to the vessel 102. The first float of the second main source 122 can be coupled to the vessel 102 by a gun string. The first float of the second main source 122 can include a plurality of gun plates. The plurality of air guns can be coupled to the plurality of gun plates.

The third streamer 205 can couple with the second float of the first main source 114. The second float of the first main source 114 can include a plurality of air guns. The plurality of air guns can be coupled to the second float of the first main source 114. The plurality of air guns can be coupled to the second float of the first main source 114 by a plurality of gun chains. The second float of the first main source 114 can be coupled to the receiver array 105. The second float of the first main source 114 can be coupled to the vessel 102. The second float of the first main source 114 can be coupled to the vessel 102 by a gun string. The second float of the first main source 114 can include a plurality of gun plates. The plurality of air guns can be coupled to the plurality of gun plates. The first plurality of receivers 120 can be coupled with the third streamer 205. The second plurality of receivers 125 can be coupled with the third streamer 205.

The fourth streamer 210 can couple with the second float of the second main source 124. The second main source 140 can include a second float of the second main source 124. The second float of the second main source 124 can include a plurality of air guns. The plurality of air guns can be coupled to the second float of the second main source 124. The plurality of air guns can be coupled to the second float of the second main source 124 by a plurality of gun chains. The second float of the second main source 124 can be coupled to the receiver array 105. The second float of the second main source 124 can be coupled to the vessel 102. The second float of the second main source 124 can be coupled to the vessel 102 by a gun string. The second float of the second main source 124 can include a plurality of gun plates. The plurality of air guns can be coupled to the plurality of gun plates. The distance 225 between the second float of the first main source 114 and the second float of the second main source 124 can be between 40 and 60 meters. For example, the distance 225 between the second float of the first main source 114 and the second float of the second main source 124 can be 50 meters. The first plurality of receivers 120 can be coupled with the fourth streamer 210. The second plurality of receivers 125 can be coupled with the fourth streamer 210.

The fifth streamer 215 can couple with the third float of the first main source 116. The first main source 135 can include a third float of the first main source 116. The third float of the first main source 116 can include a plurality of air guns. The plurality of air guns can be coupled to the third float of the first main source 116. The plurality of air guns can be coupled to the third float of the first main source 116 by a plurality of gun chains. The third float of the first main source 116 can be coupled to the receiver array 105. The third float of the first main source 116 can be coupled to the vessel 102. The third float of the first main source 116 can be coupled to the vessel 102 by a gun string. The third float of the first main source 116 can include a plurality of gun plates. The plurality of air guns can be coupled to the plurality of gun plates. The first plurality of receivers 120 can be coupled with the fifth streamer 215. The second plurality of receivers 125 can be coupled with the fifth streamer 215.

The sixth streamer 220 can couple with the second float of the second main source 126. The second main source 140 can include a third float of the second main source 126. The third float of the second main source 126 can include a plurality of air guns. The plurality of air guns can be coupled to the third float of the second main source 126. The plurality of air guns can be coupled to the third float of the second main source 126 by a plurality of gun chains. The third float of the second main source 126 can be coupled to the receiver array 105. The third float of the second main source 126 can be coupled to the vessel 102. The third float of the second main source 126 can be coupled to the vessel 102 by a gun string. The third float of the second main source 126 can include a plurality of gun plates. The plurality of air guns can be coupled to the plurality of gun plates. The distance 230 between the sixth streamer 220 and the fifth streamer 215 can be between 30 and 40 meters. For example, the distance 230 between the sixth streamer 220 and the fifth streamer 215 can be 37.5 meters. The first plurality of receivers 120 can be coupled with the sixth streamer 220. The second plurality of receivers 125 can be coupled with the sixth streamer 220.

The seismic survey system 100 can include an accessory source array 145. The accessory source array 145 can generate an acoustic signal to be received by the receiver array 105. The accessory source array 145 can generate high frequency waves (e.g., greater than 1000 Hz, greater than 1500 Hz). The accessory source array 145 can generate waves at a different frequency than wave generated by the main source array 130. For example, the accessory source array 145 can generate waves at a higher frequency than the frequency of the waves generated by the main source array 130. The accessory source array 145 can generate waves at a lower frequency than the frequency of the waves generated by the main source array 130. The accessory source array 145 can include a first accessory source 150 and a second accessory source 160. The first accessory source 150 can be coupled with the main source array 130. The first accessory source 150 can be directly coupled with the main source array 130. For example, the first accessory source 150 can couple with the first main source 135. The first accessory source 150 can be mounted on the first main source 135. The first accessory source 150 can be removably attached to the first main source 135.

The first accessory source 150 can generate a source shot. The first accessory source 150 can generate acoustic waves. The first accessory source 150 can generate an acoustic signal to be received by the receiver array 105. The first accessory source 150 can generate high frequency waves (e.g., greater than 1000 Hz, greater than 1500 Hz). The first accessory source 150 can couple with the second float of the first main source 114. The first accessory source 150 can be mounted on the second float of the first main source 114. The first accessory source 150 can be removably attached to the second float of the first main source 114. The second accessory source 160 can couple with the second main source 140. The second accessory source 160 can be coupled with the main source array 130. The second accessory source 160 can be directly coupled with the main source array 130. For example, the second accessory source 160 can be mounted on the second main source 140. The second accessory source 160 can be removably attached to the second main source 140.

The second accessory source 160 can generate a source shot. The second accessory source 160 can generate acoustic waves. The second accessory source 160 can generate an acoustic signal to be received by the receiver array 105. The second accessory source 160 can generate high frequency waves (e.g., greater than 1000 Hz, greater than 1500 Hz). The second accessory source 160 can couple with the second float of the second main source 124. The second accessory source 160 can be mounted on the second float of the second main source 124. The second accessory source 160 can be removably attached to the second float of the second main source 124. The second accessory source 160 can generate waves at a higher frequency than the frequency of the waves generated by the main source array 130. For example, the second accessory source 160 can generate waves at a higher frequency than the frequency of the waves generated by the first main source 135. The second accessory source 160 can generate waves at a higher frequency than the frequency of the waves generated by the second main source 140. The second accessory source 160 can generate waves at a lower frequency than the frequency of the waves generated by the main source array 130. For example, the second accessory source 160 can generate waves at a lower frequency than the frequency of the waves generated by the first main source 135. The second accessory source 160 can generate waves at a lower frequency than the frequency of the waves generated by the second main source 140.

Figure 3:
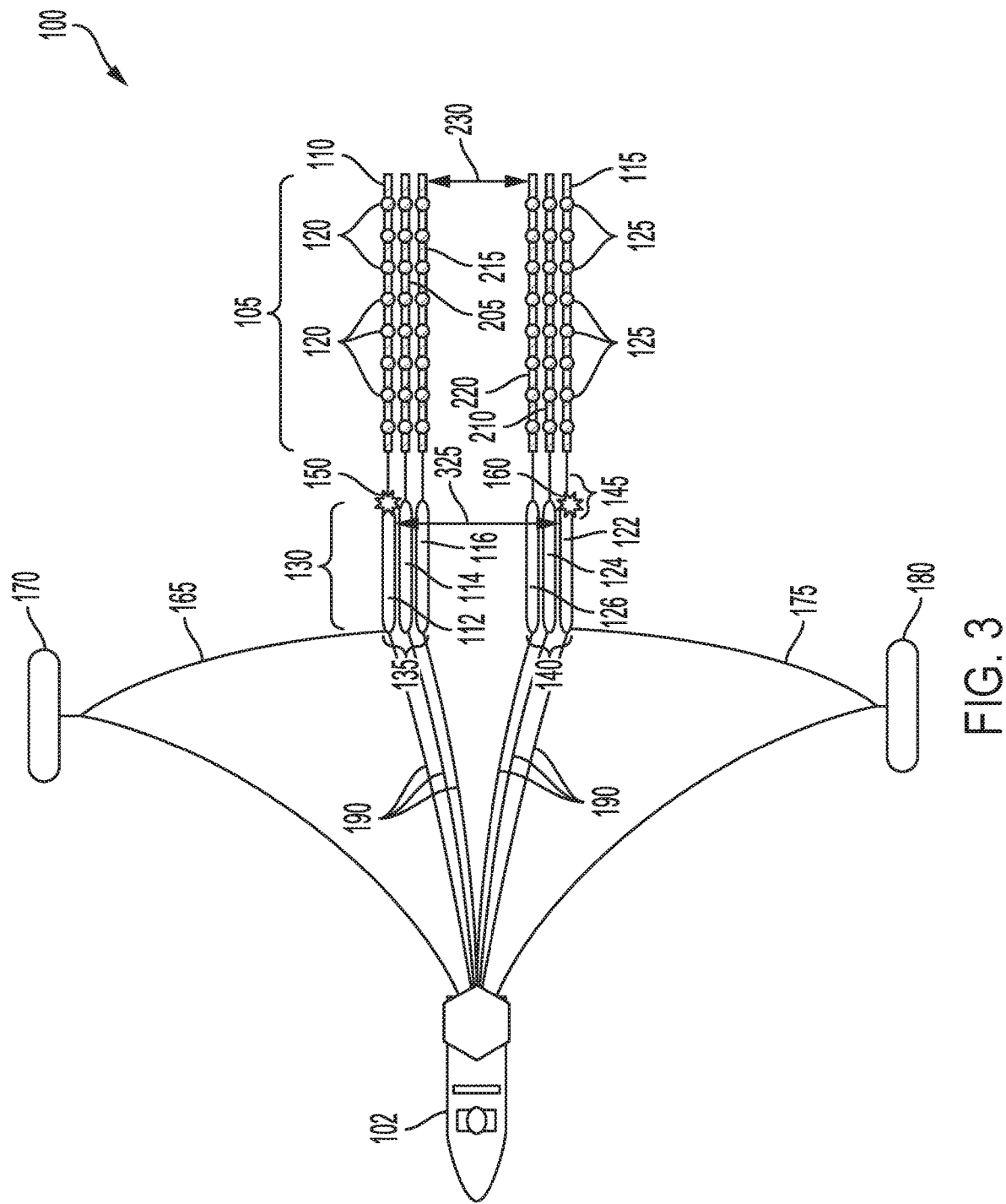
FIG. 3 illustrates a seismic survey system according to an example implementation.

FIG. 3 illustrates an example seismic survey system 100. The seismic survey system 100 can include a receiver array 105. The receiver array 105 can include a first streamer 110. The receiver array 105 can include a second streamer 115. The receiver array 105 can include a third streamer 205. The receiver array 105 can include a fourth streamer 210. The receiver array 105 can include a fifth streamer 215. The receiver array 105 can include a sixth streamer 220. The first streamer 110 may be a cable (e.g., a surface marine cable), an assembly of wires, or any component capable of connecting a receiver to a recording device which may be located on a vessel 102. The second streamer 115 may be a cable (e.g., a surface marine cable), an assembly of wires, or any component capable of connecting a receiver to a recording device which may be located on a vessel 102. The third streamer 205 may be a cable (e.g., a surface marine cable), an assembly of wires, or any component capable of connecting a receiver to a recording device which may be located on a vessel 102. The fourth streamer 210 may be a cable (e.g., a surface marine cable), an assembly of wires, or any component capable of connecting a receiver to a recording device which may be located on a vessel 102. The fifth streamer 215 may be a cable (e.g., a surface marine cable), an assembly of wires, or any component capable of connecting a receiver to a recording device which may be located on a vessel 102. The sixth streamer 220 may be a cable (e.g., a surface marine cable), an assembly of wires, or any component capable of connecting a receiver to a recording device which may be located on a vessel 102.

The seismic survey system 100 can include a first plurality of receivers 120. The first plurality of receivers 120 can be coupled with the first streamer 110. The first plurality of receivers 120 can be disposed on the first streamer 110. The first plurality of receivers 120 can be coupled to the first streamer 110 along a line. The first plurality of receivers 120 can be evenly spaced along the first streamer 110. The first plurality of receivers 120 can receive reflection data reflected off an object in a seabed. For example, a receiver of the first plurality of receivers 120 may be a hydrophone or any other device capable of collecting seismic data. Seismic data can include reflection data indicating subsurface features of the seabed. Seismic data can include reflection data indicating features on the seabed. The first plurality of receivers 120 can be configured to detect acoustic waves that are reflected by seabed objects. The seabed objects can be completely buried within the seabed. The seabed objects can be partially buried within the seabed. The first plurality of receivers 120 can receive reflection data indicating fluid escape from pipes on or below the seabed. The first plurality of receivers 120 can receive reflection data indicating gas escape from pipes on or below the seabed.

The seismic survey system 100 can include a second plurality of receivers 125. The second plurality of receivers 125 can be coupled with the second streamer 115. The second plurality of receivers 125 can be disposed on the second streamer 115. The second plurality of receivers 125 can be coupled to the second streamer 115 along a line. The second plurality of receivers 125 can be evenly spaced along the second streamer 115. The second plurality of receivers 125 can receive reflection data reflected off an object in a seabed. For example, a receiver of the second plurality of receivers 125 may be a hydrophone or any other device capable of collecting seismic data. Seismic data can include reflection data indicating subsurface features of the seabed. Seismic data can include reflection data indicating features on the seabed. The second plurality of receivers 125 can be configured to detect acoustic waves that are reflected by seabed objects. The seabed objects can be completely buried within the seabed. The seabed objects can be partially buried within the seabed. The second plurality of receivers 125 can receive reflection data indicating fluid escape from pipes on or below the seabed. The second plurality of receivers 125 can receive reflection data indicating gas escape from pipes on or below the seabed.

The seismic survey system 100 can include a main source array 130. The main source array 130 can generate an acoustic signal to be received by the receiver array 105. The main source array 130 can generate low frequency waves (e.g., 50 Hz). The main source array 130 can include a first main source 135. The first main source 135 can generate a source shot. The first main source 135 can be an electrical source. The first main source 135 can be an acoustic source. The first main source 135 can generate acoustic waves. The first main source 135 can generate an acoustic signal to be received by the receiver array 105. The first main source 135 can generate low frequency waves (e.g., 50 Hz). The first main source 135 can include a first float of the first main source 112, a second float of the first main source 114, and a third float of the first main source 116.

The main source array 130 can include a second main source 140. The second main source 140 can generate a source shot. The second main source 140 can generate a source shot. The second main source 140 can be an electrical source. The second main source 140 can be an acoustic source. The second main source 140 can generate acoustic waves. The second main source 140 can generate an acoustic signal to be received by the receiver array 105. The second main source 140 can generate low frequency waves (e.g., 50 Hz). The second main source 140 can include a first float of the second main source 122, a second float of the second main source 124, and a third float of the second main source 126. The distance 325 between the first main source 135 and the second main source 140 can be between 50 and 70 meters. For example, the distance 325 between the first main source 135 and the second main source 140 can be 62.5 meters.

The first streamer 110 can couple with the first float of the first main source 112. The first float of the first main source 112 can include a plurality of air guns. The plurality of air guns can be coupled to the first float of the first main source 112. The plurality of air guns can be coupled to the first float of the first main source 112 by a plurality of gun chains. The first float of the first main source 112 can be coupled to the receiver array 105. The first float of the first main source 112 can be coupled to the vessel 102. The first float of the first main source 112 can be coupled to the vessel 102 by a gun string. The first float of the first main source 112 can include a plurality of gun plates. The plurality of air guns can be coupled to the plurality of gun plates.

The second streamer 115 can couple with the first float of the second main source 122. The first float of the second main source 122 can include a plurality of air guns. The plurality of air guns can be coupled to the first float of the second main source 122. The plurality of air guns can be coupled to the first float of the second main source 122 by a plurality of gun chains. The first float of the second main source 122 can be coupled to the receiver array 105. The first float of the second main source 122 can be coupled to the vessel 102. The first float of the second main source 122 can be coupled to the vessel 102 by a gun string. The first float of the second main source 122 can include a plurality of gun plates. The plurality of air guns can be coupled to the plurality of gun plates.

The third streamer 205 can couple with the second float of the first main source 114. The second float of the first main source 114 can include a plurality of air guns. The plurality of air guns can be coupled to the second float of the first main source 114. The plurality of air guns can be coupled to the second float of the first main source 114 by a plurality of gun chains. The second float of the first main source 114 can be coupled to the receiver array 105. The second float of the first main source 114 can be coupled to the vessel 102. The second float of the first main source 114 can be coupled to the vessel 102 by a gun string. The second float of the first main source 114 can include a plurality of gun plates. The plurality of air guns can be coupled to the plurality of gun plates.

The fourth streamer 210 can couple with the second float of the second main source 124. The second main source 140 can include a second float of the second main source 124. The second float of the second main source 124 can include a plurality of air guns. The plurality of air guns can be coupled to the second float of the second main source 124. The plurality of air guns can be coupled to the second float of the second main source 124 by a plurality of gun chains. The second float of the second main source 124 can be coupled to the receiver array 105. The second float of the second main source 124 can be coupled to the vessel 102. The second float of the second main source 124 can be coupled to the vessel 102 by a gun string. The second float of the second main source 124 can include a plurality of gun plates. The plurality of air guns can be coupled to the plurality of gun plates.

The fifth streamer 215 can couple with the third float of the first main source 116. The first main source 135 can include a third float of the first main source 116. The third float of the first main source 116 can include a plurality of air guns. The plurality of air guns can be coupled to the third float of the first main source 116. The plurality of air guns can be coupled to the third float of the first main source 116 by a plurality of gun chains. The third float of the first main source 116 can be coupled to the receiver array 105. The third float of the first main source 116 can be coupled to the vessel 102. The third float of the first main source 116 can be coupled to the vessel 102 by a gun string. The third float of the first main source 116 can include a plurality of gun plates. The plurality of air guns can be coupled to the plurality of gun plates.

The sixth streamer 220 can couple with the second float of the second main source 126. The second main source 140 can include a third float of the second main source 126. The third float of the second main source 126 can include a plurality of air guns. The plurality of air guns can be coupled to the third float of the second main source 126. The plurality of air guns can be coupled to the third float of the second main source 126 by a plurality of gun chains. The third float of the second main source 126 can be coupled to the receiver array 105. The third float of the second main source 126 can be coupled to the vessel 102. The third float of the second main source 126 can be coupled to the vessel 102 by a gun string. The third float of the second main source 126 can include a plurality of gun plates. The plurality of air guns can be coupled to the plurality of gun plates. The distance 230 between the sixth streamer 220 and the fifth streamer 215 can be between 30 and 40 meters. For example, the distance 230 between the sixth streamer 220 and the fifth streamer 215 can be 37.5 meters. The distance 325 between the first float of the first main source 112 and the first float of the second main source 122 can be between 50 and 70 meters. For example, the distance 325 between the first float of the first main source 112 and the first float of the second main source 122 can be 62.5 meters.

The seismic survey system 100 can include an accessory source array 145. The accessory source array 145 can generate an acoustic signal to be received by the receiver array 105. The accessory source array 145 can generate high frequency waves (e.g., greater than 1000 Hz, greater than 1500 Hz). The accessory source array 145 can generate waves at a different frequency than wave generated by the main source array 130. For example, the accessory source array 145 can generate waves at a higher frequency than the frequency of the waves generated by the main source array 130. The accessory source array 145 can generate waves at a lower frequency than the frequency of the waves generated by the main source array 130. The accessory source array 145 can include a first accessory source 150 and a second accessory source 160. The first accessory source 150 can couple with the first main source 135. The first accessory source 150 can be coupled with the main source array 130. The first accessory source 150 can be directly coupled with the main source array 130. For example, the first accessory source 150 can be mounted on the first main source 135. The first accessory source 150 can be removably attached to the first main source 135.

The first accessory source 150 can generate a source shot. The first accessory source 150 can generate acoustic waves. The first accessory source 150 can generate an acoustic signal to be received by the receiver array 105. The first accessory source 150 can generate high frequency waves (e.g., greater than 1000 Hz, greater than 1500 Hz). The first accessory source 150 can generate waves at a higher frequency than the frequency of the waves generated by the main source array 130. For example, the first accessory source 150 can generate waves at a higher frequency than the frequency of the waves generated by the first main source 135. The first accessory source 150 can generate waves at a higher frequency than the frequency of the waves generated by the second main source 140. The first accessory source 150 can generate waves at a lower frequency than the frequency of the waves generated by the main source array 130. For example, the first accessory source 150 can generate waves at a lower frequency than the frequency of the waves generated by the first main source 135. The first accessory source 150 can generate waves at a lower frequency than the frequency of the waves generated by the second main source 140. The first accessory source 150 can couple with the first float of the first main source 112. The first accessory source 150 can be mounted on the first float of the first main source 112. The first accessory source 150 can be removably attached to the first float of the first main source 112.

The second accessory source 160 can couple with the second main source 140. The second accessory source 160 can be coupled with the main source array 130. The second accessory source 160 can be directly coupled with the main source array 130. For example, the second accessory source 160 can be mounted on the second main source 140. The second accessory source 160 can be removably attached to the second main source 140. The second accessory source 160 can generate a source shot. The second accessory source 160 can generate acoustic waves. The second accessory source 160 can generate an acoustic signal to be received by the receiver array 105. The second accessory source 160 can generate high frequency waves (e.g., greater than 1000 Hz, greater than 1500 Hz). The second accessory source 160 can generate waves at a higher frequency than the frequency of the waves generated by the main source array 130. For example, the second accessory source 160 can generate waves at a higher frequency than the frequency of the waves generated by the first main source 135. The second accessory source 160 can generate waves at a higher frequency than the frequency of the waves generated by the second main source 140. The second accessory source 160 can generate waves at a lower frequency than the frequency of the waves generated by the main source array 130. For example, the second accessory source 160 can generate waves at a lower frequency than the frequency of the waves generated by the first main source 135. The second accessory source 160 can generate waves at a lower frequency than the frequency of the waves generated by the second main source 140. The second accessory source 160 can couple with the first float of the second main source 122. The second accessory source 160 can be mounted on the first float of the second main source 122. The second accessory source 160 can be removably attached to the first float of the second main source 122.

Figure 4:
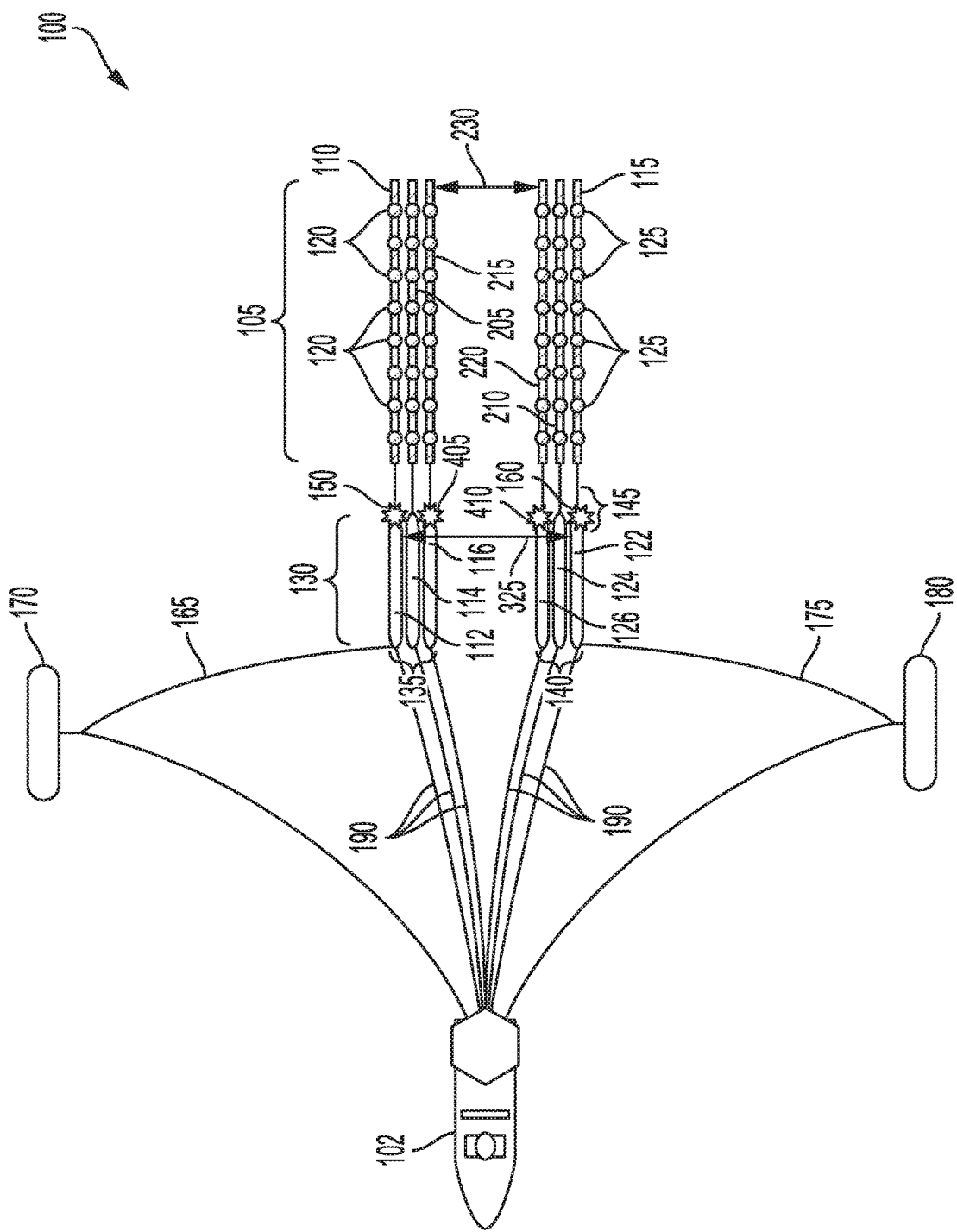
FIG. 4 illustrates a seismic survey system according to an example implementation.

FIG. 4 illustrates an example seismic survey system 100. The seismic survey system 100 can include a receiver array 105. The receiver array 105 can include a first streamer 110. The receiver array 105 can include a second streamer 115. The receiver array 105 can include a third streamer 205. The receiver array 105 can include a fourth streamer 210. The receiver array 105 can include a fifth streamer 215. The receiver array 105 can include a sixth streamer 220. The first streamer 110 may be a cable (e.g., a surface marine cable), an assembly of wires, or any component capable of connecting a receiver to a recording device which may be located on a vessel 102. The second streamer 115 may be a cable (e.g., a surface marine cable), an assembly of wires, or any component capable of connecting a receiver to a recording device which may be located on a vessel 102. The third streamer 205 may be a cable (e.g., a surface marine cable), an assembly of wires, or any component capable of connecting a receiver to a recording device which may be located on a vessel 102. The fourth streamer 210 may be a cable (e.g., a surface marine cable), an assembly of wires, or any component capable of connecting a receiver to a recording device which may be located on a vessel 102. The fifth streamer 215 may be a cable (e.g., a surface marine cable), an assembly of wires, or any component capable of connecting a receiver to a recording device which may be located on a vessel 102. The sixth streamer 220 may be a cable (e.g., a surface marine cable), an assembly of wires, or any component capable of connecting a receiver to a recording device which may be located on a vessel 102.

The seismic survey system 100 can include a first plurality of receivers 120. The first plurality of receivers 120 can be coupled with the first streamer 110. The first plurality of receivers 120 can be disposed on the first streamer 110. The first plurality of receivers 120 can be coupled to the first streamer 110 along a line. The first plurality of receivers 120 can be evenly spaced along the first streamer 110. The first plurality of receivers 120 can receive reflection data reflected off an object in a seabed. For example, a receiver of the first plurality of receivers 120 may be a hydrophone or any other device capable of collecting seismic data. Seismic data can include reflection data indicating subsurface features of the seabed. Seismic data can include reflection data indicating features on the seabed. The first plurality of receivers 120 can be configured to detect acoustic waves that are reflected by seabed objects. The seabed objects can be completely buried within the seabed. The seabed objects can be partially buried within the seabed. The first plurality of receivers 120 can receive reflection data indicating fluid escape from pipes on or below the seabed. The first plurality of receivers 120 can receive reflection data indicating gas escape from pipes on or below the seabed.

The seismic survey system 100 can include a second plurality of receivers 125. The second plurality of receivers 125 can be coupled with the second streamer 115. The second plurality of receivers 125 can be disposed on the second streamer 115. The second plurality of receivers 125 can be coupled to the second streamer 115 along a line. The second plurality of receivers 125 can be evenly spaced along the second streamer 115. The second plurality of receivers 125 can receive reflection data reflected off an object in a seabed. For example, a receiver of the second plurality of receivers 125 may be a hydrophone or any other device capable of collecting seismic data. Seismic data can include reflection data indicating subsurface features of the seabed. Seismic data can include reflection data indicating features on the seabed. The second plurality of receivers 125 can be configured to detect acoustic waves that are reflected by seabed objects. The seabed objects can be completely buried within the seabed. The seabed objects can be partially buried within the seabed. The second plurality of receivers 125 can receive reflection data indicating fluid escape from pipes on or below the seabed. The second plurality of receivers 125 can receive reflection data indicating gas escape from pipes on or below the seabed.

The seismic survey system 100 can include a main source array 130. The main source array 130 can generate an acoustic signal to be received by the receiver array 105. The main source array 130 can generate low frequency waves (e.g., 50 Hz). The main source array 130 can include a first main source 135. The first main source 135 can generate a source shot. The first main source 135 can be an electrical source. The first main source 135 can be an acoustic source. The first main source 135 can generate acoustic waves. The first main source 135 can generate an acoustic signal to be received by the receiver array 105. The first main source 135 can generate low frequency waves (e.g., 50 Hz). The first main source 135 can include a first float of the first main source 112, a second float of the first main source 114, and a third float of the first main source 116.

The main source array 130 can include a second main source 140. The second main source 140 can generate a source shot. The second main source 140 can generate a source shot. The second main source 140 can be an electrical source. The second main source 140 can be an acoustic source. The second main source 140 can generate acoustic waves. The second main source 140 can generate an acoustic signal to be received by the receiver array 105. The second main source 140 can generate low frequency waves (e.g., 50 Hz). The second main source 140 can include a first float of the second main source 122, a second float of the second main source 124, and a third float of the second main source 126. The distance 325 between the first main source 135 and the second main source 140 can be between 50 and 70 meters. For example, the distance 325 between the first main source 135 and the second main source 140 can be 62.5 meters.

The first streamer 110 can couple with the first float of the first main source 112. The first float of the first main source 112 can include a plurality of air guns. The plurality of air guns can be coupled to the first float of the first main source 112. The plurality of air guns can be coupled to the first float of the first main source 112 by a plurality of gun chains. The first float of the first main source 112 can be coupled to the receiver array 105. The first float of the first main source 112 can be coupled to the vessel 102. The first float of the first main source 112 can be coupled to the vessel 102 by a gun string. The first float of the first main source 112 can include a plurality of gun plates. The plurality of air guns can be coupled to the plurality of gun plates.

The second streamer 115 can couple with the first float of the second main source 122. The first float of the second main source 122 can include a plurality of air guns. The plurality of air guns can be coupled to the first float of the second main source 122. The plurality of air guns can be coupled to the first float of the second main source 122 by a plurality of gun chains. The first float of the second main source 122 can be coupled to the receiver array 105. The first float of the second main source 122 can be coupled to the vessel 102. The first float of the second main source 122 can be coupled to the vessel 102 by a gun string. The first float of the second main source 122 can include a plurality of gun plates. The plurality of air guns can be coupled to the plurality of gun plates.

The third streamer 205 can couple with the second float of the first main source 114. The second float of the first main source 114 can include a plurality of air guns. The plurality of air guns can be coupled to the second float of the first main source 114. The plurality of air guns can be coupled to the second float of the first main source 114 by a plurality of gun chains. The second float of the first main source 114 can be coupled to the receiver array 105. The second float of the first main source 114 can be coupled to the vessel 102. The second float of the first main source 114 can be coupled to the vessel 102 by a gun string. The second float of the first main source 114 can include a plurality of gun plates. The plurality of air guns can be coupled to the plurality of gun plates.

The fourth streamer 210 can couple with the second float of the second main source 124. The second main source 140 can include a second float of the second main source 124. The second float of the second main source 124 can include a plurality of air guns. The plurality of air guns can be coupled to the second float of the second main source 124. The plurality of air guns can be coupled to the second float of the second main source 124 by a plurality of gun chains. The second float of the second main source 124 can be coupled to the receiver array 105. The second float of the second main source 124 can be coupled to the vessel 102. The second float of the second main source 124 can be coupled to the vessel 102 by a gun string. The second float of the second main source 124 can include a plurality of gun plates. The plurality of air guns can be coupled to the plurality of gun plates.

The fifth streamer 215 can couple with the third float of the first main source 116. The first main source 135 can include a third float of the first main source 116. The third float of the first main source 116 can include a plurality of air guns. The plurality of air guns can be coupled to the third float of the first main source 116. The plurality of air guns can be coupled to the third float of the first main source 116 by a plurality of gun chains. The third float of the first main source 116 can be coupled to the receiver array 105. The third float of the first main source 116 can be coupled to the vessel 102. The third float of the first main source 116 can be coupled to the vessel 102 by a gun string. The third float of the first main source 116 can include a plurality of gun plates. The plurality of air guns can be coupled to the plurality of gun plates.

The sixth streamer 220 can couple with the second float of the second main source 126. The second main source 140 can include a third float of the second main source 126. The third float of the second main source 126 can include a plurality of air guns. The plurality of air guns can be coupled to the third float of the second main source 126. The plurality of air guns can be coupled to the third float of the second main source 126 by a plurality of gun chains. The third float of the second main source 126 can be coupled to the receiver array 105. The third float of the second main source 126 can be coupled to the vessel 102. The third float of the second main source 126 can be coupled to the vessel 102 by a gun string. The third float of the second main source 126 can include a plurality of gun plates. The plurality of air guns can be coupled to the plurality of gun plates. The distance 230 between the sixth streamer 220 and the fifth streamer 215 can be between 30 and 40 meters. For example, the distance 230 between the sixth streamer 220 and the fifth streamer 215 can be 37.5 meters. The distance 325 between the first float of the first main source 112 and the first float of the second main source 122 can be between 50 and 70 meters. For example, the distance 325 between the first float of the first main source 112 and the first float of the second main source 122 can be 62.5 meters.

The seismic survey system 100 can include an accessory source array 145. The accessory source array 145 can generate an acoustic signal to be received by the receiver array 105. The accessory source array 145 can generate high frequency waves (e.g., greater than 1000 Hz, greater than 1500 Hz). The accessory source array 145 can generate waves at a different frequency than wave generated by the main source array 130. For example, the accessory source array 145 can generate waves at a higher frequency than the frequency of the waves generated by the main source array 130. The accessory source array 145 can generate waves at a lower frequency than the frequency of the waves generated by the main source array 130. The accessory source array 145 can include a first accessory source 150, a second accessory source 160, a third accessory source 405, and a fourth accessory source 410. The first accessory source 150 can couple with the first main source 135. The first accessory source 150 can be coupled with the main source array 130. The first accessory source 150 can be directly coupled with the main source array 130. For example, the first accessory source 150 can be mounted on the first main source 135. The first accessory source 150 can be removably attached to the first main source 135.

The first accessory source 150 can generate a source shot. The first accessory source 150 can generate acoustic waves. The first accessory source 150 can generate an acoustic signal to be received by the receiver array 105. The first accessory source 150 can generate high frequency waves (e.g., greater than 1000 Hz, greater than 1500 Hz). The first accessory source 150 can generate waves at a higher frequency than the frequency of the waves generated by the main source array 130. For example, the first accessory source 150 can generate waves at a higher frequency than the frequency of the waves generated by the first main source 135. The first accessory source 150 can generate waves at a higher frequency than the frequency of the waves generated by the second main source 140. The first accessory source 150 can generate waves at a lower frequency than the frequency of the waves generated by the main source array 130. For example, the first accessory source 150 can generate waves at a lower frequency than the frequency of the waves generated by the first main source 135. The first accessory source 150 can generate waves at a lower frequency than the frequency of the waves generated by the second main source 140. The first accessory source 150 can couple with the first float of the first main source 112. The first accessory source 150 can be mounted on the first float of the first main source 112. The first accessory source 150 can be removably attached to the first float of the first main source 112.

The second accessory source 160 can couple with the second main source 140. The second accessory source 160 can be coupled with the main source array 130. The second accessory source 160 can be directly coupled with the main source array 130. For example, the second accessory source 160 can be mounted on the second main source 140. The second accessory source 160 can be removably attached to the second main source 140. The second accessory source 160 can generate a source shot. The second accessory source 160 can generate acoustic waves. The second accessory source 160 can generate an acoustic signal to be received by the receiver array 105. The second accessory source 160 can generate high frequency waves (e.g., greater than 1000 Hz, greater than 1500 Hz). The second accessory source 160 can generate waves at a higher frequency than the frequency of the waves generated by the main source array 130. For example, the second accessory source 160 can generate waves at a higher frequency than the frequency of the waves generated by the first main source 135. The second accessory source 160 can generate waves at a higher frequency than the frequency of the waves generated by the second main source 140. The second accessory source 160 can generate waves at a lower frequency than the frequency of the waves generated by the main source array 130. For example, the second accessory source 160 can generate waves at a lower frequency than the frequency of the waves generated by the first main source 135. The second accessory source 160 can generate waves at a lower frequency than the frequency of the waves generated by the second main source 140. The second accessory source 160 can couple with the first float of the second main source 122. The second accessory source 160 can be mounted on the first float of the second main source 122. The second accessory source 160 can be removably attached to the first float of the second main source 122.

The third accessory source 405 can couple with the first main source 135. The third accessory source 405 can be mounted on the first main source 135. The third accessory source 405 can be removably attached to the first main source 135. The third accessory source 405 can generate a source shot. The third accessory source 405 can generate acoustic waves. The third accessory source 405 can generate an acoustic signal to be received by the receiver array 105. The third accessory source 405 can generate high frequency waves (e.g., greater than 1000 Hz, greater than 1500 Hz).

The third accessory source 405 can couple with the third float of the first main source 116. The third accessory source 405 can be mounted on the third float of the first main source 116. The third accessory source 405 can be removably attached to the third float of the first main source 116.

The fourth accessory source 410 can couple with the second main source 140. The fourth accessory source 410 can be mounted on the second main source 140. The fourth accessory source 410 can be removably attached to the second main source 140. The fourth accessory source 410 can generate a source shot. The fourth accessory source 410 can generate acoustic waves. The fourth accessory source 410 can generate an acoustic signal to be received by the receiver array 105. The fourth accessory source 410 can generate high frequency waves (e.g., greater than 1000 Hz, greater than 1500 Hz). The fourth accessory source 410 can couple with the third float of the second main source 126. The fourth accessory source 410 can be mounted on the third float of the second main source 126. The fourth accessory source 410 can be removably attached to the third float of the second main source 126.

Figure 5:
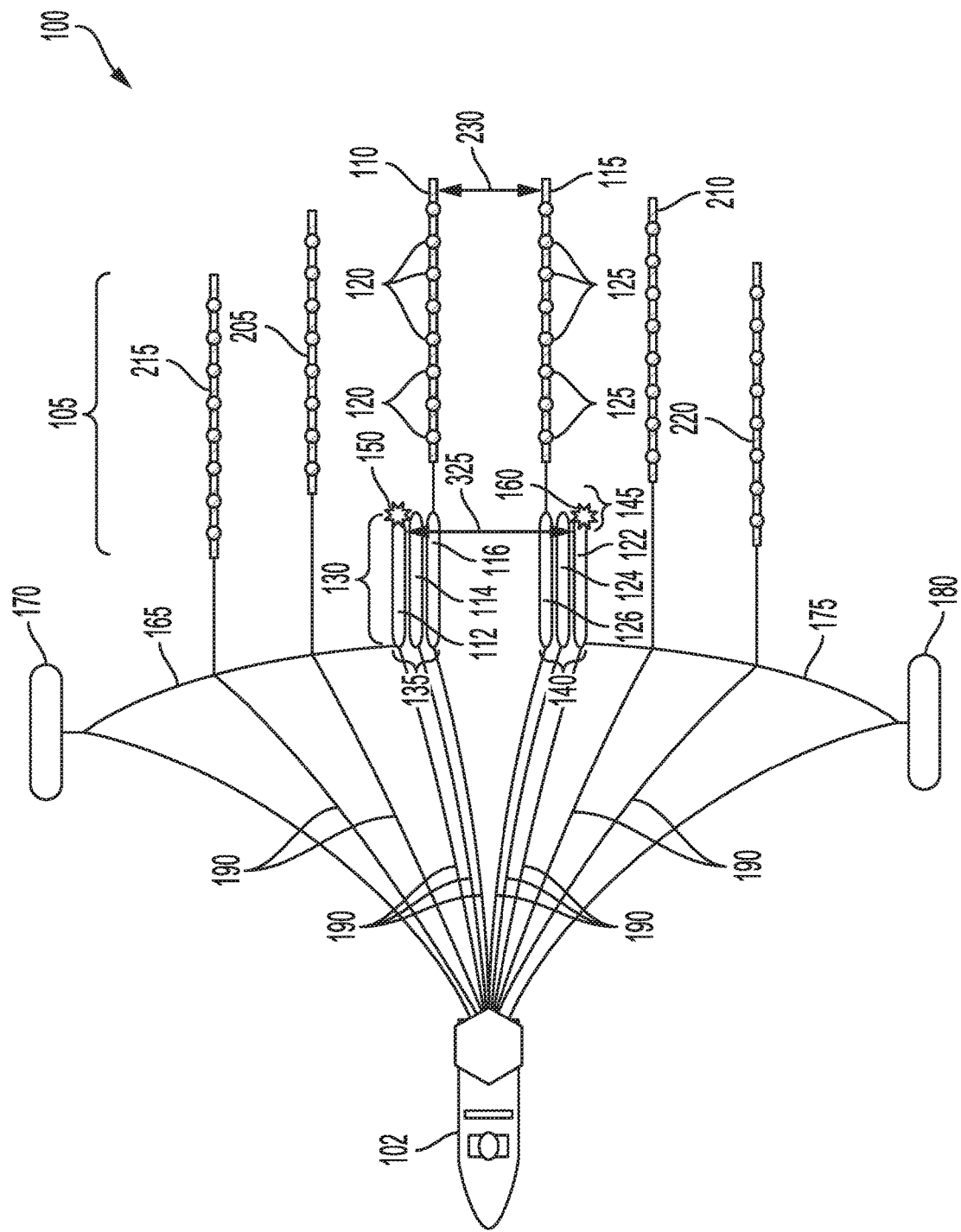
FIG. 5 illustrates a seismic survey system according to an example implementation.

FIG. 5 illustrates an example seismic survey system 100. The seismic survey system 100 can include a receiver array 105. The receiver array 105 can include a first streamer 110. The receiver array 105 can include a second streamer 115. The receiver array 105 can include a third streamer 205. The receiver array 105 can include a fourth streamer 210. The receiver array 105 can include a fifth streamer 215. The receiver array 105 can include a sixth streamer 220. The first streamer 110 may be a cable (e.g., a surface marine cable), an assembly of wires, or any component capable of connecting a receiver to a recording device which may be located on a vessel 102. The second streamer 115 may be a cable (e.g., a surface marine cable), an assembly of wires, or any component capable of connecting a receiver to a recording device which may be located on a vessel 102. The third streamer 205 may be a cable (e.g., a surface marine cable), an assembly of wires, or any component capable of connecting a receiver to a recording device which may be located on a vessel 102. The fourth streamer 210 may be a cable (e.g., a surface marine cable), an assembly of wires, or any component capable of connecting a receiver to a recording device which may be located on a vessel 102. The fifth streamer 215 may be a cable (e.g., a surface marine cable), an assembly of wires, or any component capable of connecting a receiver to a recording device which may be located on a vessel 102. The sixth streamer 220 may be a cable (e.g., a surface marine cable), an assembly of wires, or any component capable of connecting a receiver to a recording device which may be located on a vessel 102.

The seismic survey system 100 can include a first plurality of receivers 120. The first plurality of receivers 120 can be coupled with the first streamer 110. The first plurality of receivers 120 can be disposed on the first streamer 110. The first plurality of receivers 120 can be coupled to the first streamer 110 along a line. The first plurality of receivers 120 can be evenly spaced along the first streamer 110. The first plurality of receivers 120 can receive reflection data reflected off an object in a seabed. For example, a receiver of the first plurality of receivers 120 may be a hydrophone or any other device capable of collecting seismic data. Seismic data can include reflection data indicating subsurface features of the seabed. Seismic data can include reflection data indicating features on the seabed. The first plurality of receivers 120 can be configured to detect acoustic waves that are reflected by seabed objects. The seabed objects can be completely buried within the seabed. The seabed objects can be partially buried within the seabed. The first plurality of receivers 120 can receive reflection data indicating fluid escape from pipes on or below the seabed. The first plurality of receivers 120 can receive reflection data indicating gas escape from pipes on or below the seabed.

The seismic survey system 100 can include a second plurality of receivers 125. The second plurality of receivers 125 can be coupled with the second streamer 115. The second plurality of receivers 125 can be disposed on the second streamer 115. The second plurality of receivers 125 can be coupled to the second streamer 115 along a line. The second plurality of receivers 125 can be evenly spaced along the second streamer 115. The second plurality of receivers 125 can receive reflection data reflected off an object in a seabed. For example, a receiver of the second plurality of receivers 125 may be a hydrophone or any other device capable of collecting seismic data. Seismic data can include reflection data indicating subsurface features of the seabed. Seismic data can include reflection data indicating features on the seabed. The second plurality of receivers 125 can be configured to detect acoustic waves that are reflected by seabed objects. The seabed objects can be completely buried within the seabed. The seabed objects can be partially buried within the seabed. The second plurality of receivers 125 can receive reflection data indicating fluid escape from pipes on or below the seabed. The second plurality of receivers 125 can receive reflection data indicating gas escape from pipes on or below the seabed.

The seismic survey system 100 can include a main source array 130. The main source array 130 can generate an acoustic signal to be received by the receiver array 105. The main source array 130 can generate low frequency waves (e.g., 50 Hz). The main source array 130 can include a first main source 135. The first main source 135 can generate a source shot. The first main source 135 can be an electrical source. The first main source 135 can be an acoustic source. The first main source 135 can generate acoustic waves. The first main source 135 can generate an acoustic signal to be received by the receiver array 105. The first main source 135 can generate low frequency waves (e.g., 50 Hz). The first main source 135 can include a first float of the first main source 112, a second float of the first main source 114, and a third float of the first main source 116.

The main source array 130 can include a second main source 140. The second main source 140 can generate a source shot. The second main source 140 can generate a source shot. The second main source 140 can be an electrical source. The second main source 140 can be an acoustic source. The second main source 140 can generate acoustic waves. The second main source 140 can generate an acoustic signal to be received by the receiver array 105. The second main source 140 can generate low frequency waves (e.g., 50 Hz). The second main source 140 can include a first float of the second main source 122, a second float of the second main source 124, and a third float of the second main source 126. The distance 325 between the first main source 135 and the second main source 140 can be between 50 and 70 meters. For example, the distance 325 between the first main source 135 and the second main source 140 can be 62.5 meters.

The first streamer 110 can couple with the third float of the first main source 116. The first float of the first main source 112 can include a plurality of air guns. The plurality of air guns can be coupled to the first float of the first main source 112. The plurality of air guns can be coupled to the first float of the first main source 112 by a plurality of gun chains. The first float of the first main source 112 can be coupled to the receiver array 105. The first float of the first main source 112 can be coupled to the vessel 102. The first float of the first main source 112 can be coupled to the vessel 102 by a gun string. The first float of the first main source 112 can include a plurality of gun plates. The plurality of air guns can be coupled to the plurality of gun plates.

The second streamer 115 can couple with the first float of the second main source 122. The first float of the second main source 122 can include a plurality of air guns. The plurality of air guns can be coupled to the first float of the second main source 122. The plurality of air guns can be coupled to the first float of the second main source 122 by a plurality of gun chains. The first float of the second main source 122 can be coupled to the receiver array 105. The first float of the second main source 122 can be coupled to the vessel 102. The first float of the second main source 122 can be coupled to the vessel 102 by a gun string. The first float of the second main source 122 can include a plurality of gun plates. The plurality of air guns can be coupled to the plurality of gun plates. The distance 325 between the first float of the first main source 112 and the first float of the second main source 122 can be between 50 and 70 meters. For example, the distance 325 between the first float of the first main source 112 and the first float of the second main source 122 can be 62.5 meters.

The third streamer 205 can couple with the first lateral cable 165. The fifth streamer 215 can couple with the first lateral cable 165. The first lateral cable 165 can couple with a first diverter 170. The first lateral cable 165 can couple with the first main source 135. The first lateral cable 165 may be a cable (e.g., a surface marine cable), an assembly of wires, a tether, or a rope. The first lateral cable 165 can couple to the first diverter 170 through a secondary cable. The first lateral cable 165 may be a power cable to transmit electrical power from the vessel 102 to the first main source 135. The first diverter 170 may be a diverter, a paravane or deflecting plate that redirects the motion of water past the diverter laterally to produce an amount of lateral force. The diverter can be configured to redirect flow of water past the diverter with respect to a direction of motion of the diverter through water. The diverter can include a steering device associated with the diverter. The steering device can redirect the flow of water to control an amount of lateral force generated by the diverter.

The fourth streamer 210 can couple with the second lateral cable 175. The sixth streamer 220 can couple with the second lateral cable 175. The second lateral cable 175 can couple with a second diverter 180. The second lateral cable 175 can couple with the second main source 140. The second lateral cable 175 may be a cable (e.g., a surface marine cable), an assembly of wires, a tether, or a rope. The second lateral cable 175 can couple to the second diverter 180 through a secondary cable. The second lateral cable 175 may be a power cable to transmit electrical power from the vessel 102 to the second main source 140. The second diverter 180 may be a diverter, a paravane or deflecting plate that redirects the motion of water past the diverter laterally to produce an amount of lateral force. The diverter can be configured to redirect flow of water past the diverter with respect to a direction of motion of the diverter through water. The diverter can include a steering device associated with the diverter. The steering device can redirect the flow of water to control an amount of lateral force generated by the diverter. The distance 230 between the first streamer 110 and the second streamer 115 can be between 30 and 40 meters. For example, the distance 230 between the first streamer 110 and the second streamer 115 can be 37.5 meters.

The seismic survey system 100 can include an accessory source array 145. The accessory source array 145 can generate an acoustic signal to be received by the receiver array 105. The accessory source array 145 can generate high frequency waves (e.g., greater than 1000 Hz, greater than 1500 Hz). The accessory source array 145 can generate waves at a different frequency than wave generated by the main source array 130. For example, the accessory source array 145 can generate waves at a higher frequency than the frequency of the waves generated by the main source array 130. The accessory source array 145 can generate waves at a lower frequency than the frequency of the waves generated by the main source array 130. The accessory source array 145 can include a first accessory source 150 and a second accessory source 160. The first accessory source 150 can couple with the first main source 135. The first accessory source 150 can be coupled with the main source array 130. The first accessory source 150 can be directly coupled with the main source array 130. For example, the first accessory source 150 can be mounted on the first main source 135. The first accessory source 150 can be removably attached to the first main source 135.

The first accessory source 150 can generate a source shot. The first accessory source 150 can generate acoustic waves. The first accessory source 150 can generate an acoustic signal to be received by the receiver array 105. The first accessory source 150 can generate high frequency waves (e.g., greater than 1000 Hz, greater than 1500 Hz). The first accessory source 150 can generate waves at a higher frequency than the frequency of the waves generated by the main source array 130. For example, the first accessory source 150 can generate waves at a higher frequency than the frequency of the waves generated by the first main source 135. The first accessory source 150 can generate waves at a higher frequency than the frequency of the waves generated by the second main source 140. The first accessory source 150 can generate waves at a lower frequency than the frequency of the waves generated by the main source array 130. For example, the first accessory source 150 can generate waves at a lower frequency than the frequency of the waves generated by the first main source 135. The first accessory source 150 can generate waves at a lower frequency than the frequency of the waves generated by the second main source 140. The first accessory source 150 can couple with the first float of the first main source 112. The first accessory source 150 can be mounted on the first float of the first main source 112. The first accessory source 150 can be removably attached to the first float of the first main source 112.

The second accessory source 160 can couple with the second main source 140. The second accessory source 160 can be coupled with the main source array 130. The second accessory source 160 can be directly coupled with the main source array 130. For example, the second accessory source 160 can be mounted on the second main source 140. The second accessory source 160 can be removably attached to the second main source 140.

The second accessory source 160 can generate a source shot. The second accessory source 160 can generate acoustic waves. The second accessory source 160 can generate an acoustic signal to be received by the receiver array 105. The second accessory source 160 can generate high frequency waves (e.g., greater than 1000 Hz, greater than 1500 Hz). The second accessory source 160 can generate waves at a higher frequency than the frequency of the waves generated by the main source array 130. For example, the second accessory source 160 can generate waves at a higher frequency than the frequency of the waves generated by the first main source 135. The second accessory source 160 can generate waves at a higher frequency than the frequency of the waves generated by the second main source 140. The second accessory source 160 can generate waves at a lower frequency than the frequency of the waves generated by the main source array 130. For example, the second accessory source 160 can generate waves at a lower frequency than the frequency of the waves generated by the first main source 135. The second accessory source 160 can generate waves at a lower frequency than the frequency of the waves generated by the second main source 140. The second accessory source 160 can couple with the first float of the second main source 122. The second accessory source 160 can be mounted on the first float of the second main source 122. The second accessory source 160 can be removably attached to the first float of the second main source 122.

Figure 6:
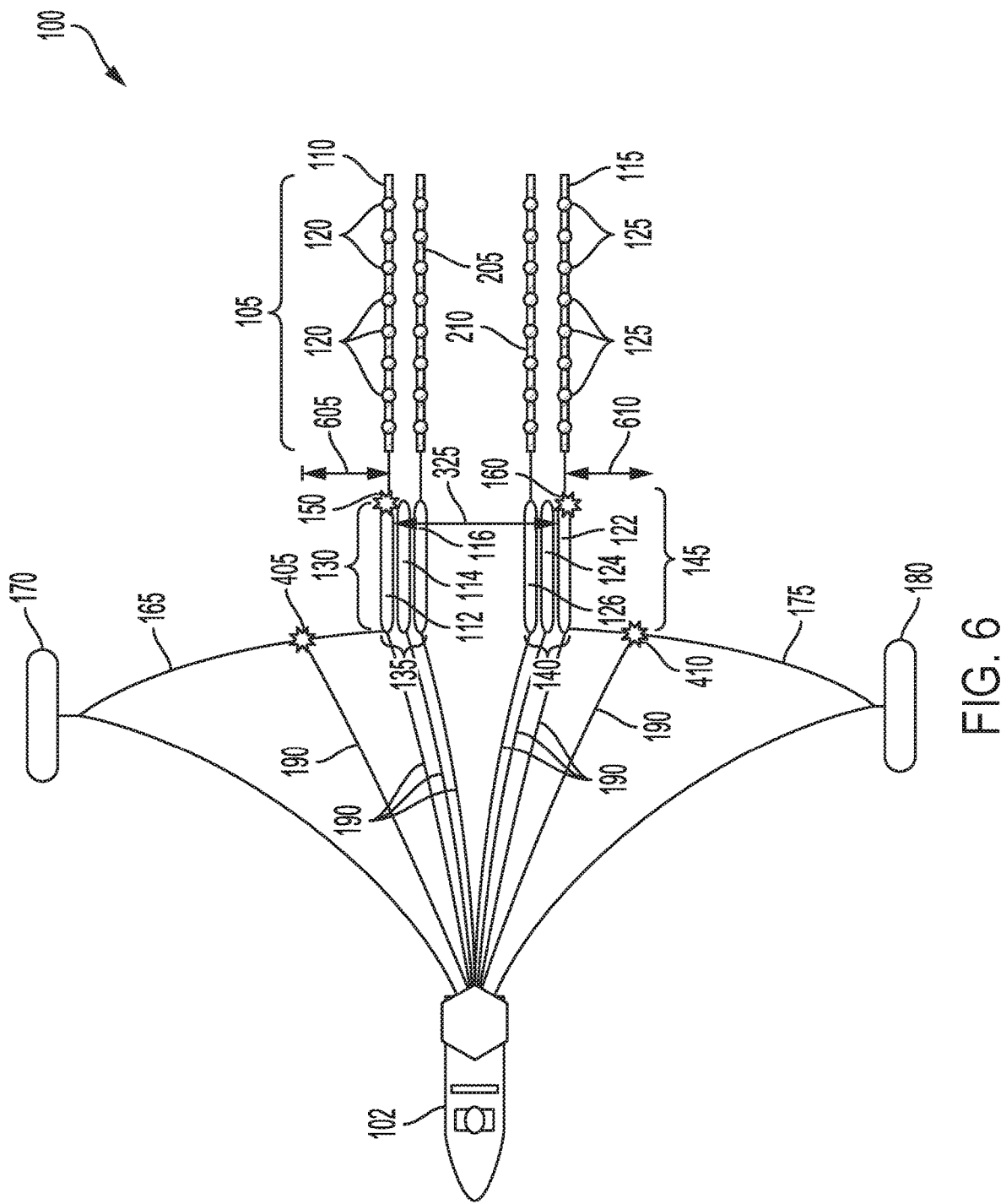
FIG. 6 illustrates a seismic survey system according to an example implementation.

FIG. 6 illustrates an example seismic survey system 100. The seismic survey system 100 can include a receiver array 105. The receiver array 105 can include a first streamer 110. The receiver array 105 can include a second streamer 115. The receiver array 105 can include a third streamer 205. The receiver array 105 can include a fourth streamer 210. The first streamer 110 may be a cable (e.g., a surface marine cable), an assembly of wires, or any component capable of connecting a receiver to a recording device which may be located on a vessel 102. The second streamer 115 may be a cable (e.g., a surface marine cable), an assembly of wires, or any component capable of connecting a receiver to a recording device which may be located on a vessel 102. The third streamer 205 may be a cable (e.g., a surface marine cable), an assembly of wires, or any component capable of connecting a receiver to a recording device which may be located on a vessel 102. The fourth streamer 210 may be a cable (e.g., a surface marine cable), an assembly of wires, or any component capable of connecting a receiver to a recording device which may be located on a vessel 102.

The seismic survey system 100 can include a first plurality of receivers 120. The first plurality of receivers 120 can be coupled with the first streamer 110. The first plurality of receivers 120 can be disposed on the first streamer 110. The first plurality of receivers 120 can be coupled to the first streamer 110 along a line. The first plurality of receivers 120 can be evenly spaced along the first streamer 110. The first plurality of receivers 120 can receive reflection data reflected off an object in a seabed. For example, a receiver of the first plurality of receivers 120 may be a hydrophone or any other device capable of collecting seismic data. Seismic data can include reflection data indicating subsurface features of the seabed. Seismic data can include reflection data indicating features on the seabed. The first plurality of receivers 120 can be configured to detect acoustic waves that are reflected by seabed objects. The seabed objects can be completely buried within the seabed. The seabed objects can be partially buried within the seabed. The first plurality of receivers 120 can receive reflection data indicating fluid escape from pipes on or below the seabed. The first plurality of receivers 120 can receive reflection data indicating gas escape from pipes on or below the seabed.

The seismic survey system 100 can include a second plurality of receivers 125. The second plurality of receivers 125 can be coupled with the second streamer 115. The second plurality of receivers 125 can be disposed on the second streamer 115. The second plurality of receivers 125 can be coupled to the second streamer 115 along a line. The second plurality of receivers 125 can be evenly spaced along the second streamer 115. The second plurality of receivers 125 can receive reflection data reflected off an object in a seabed. For example, a receiver of the second plurality of receivers 125 may be a hydrophone or any other device capable of collecting seismic data. Seismic data can include reflection data indicating subsurface features of the seabed. Seismic data can include reflection data indicating features on the seabed. The second plurality of receivers 125 can be configured to detect acoustic waves that are reflected by seabed objects. The seabed objects can be completely buried within the seabed. The seabed objects can be partially buried within the seabed. The second plurality of receivers 125 can receive reflection data indicating fluid escape from pipes on or below the seabed. The second plurality of receivers 125 can receive reflection data indicating gas escape from pipes on or below the seabed.

The seismic survey system 100 can include a main source array 130. The main source array 130 can generate an acoustic signal to be received by the receiver array 105. The main source array 130 can generate low frequency waves (e.g., 50 Hz). The main source array 130 can include a first main source 135. The first main source 135 can generate a source shot. The first main source 135 can be an electrical source. The first main source 135 can be an acoustic source. The first main source 135 can generate acoustic waves. The first main source 135 can generate an acoustic signal to be received by the receiver array 105. The first main source 135 can generate low frequency waves (e.g., 50 Hz). The first main source 135 can include a first float of the first main source 112, a second float of the first main source 114, and a third float of the first main source 116.

The main source array 130 can include a second main source 140. The second main source 140 can generate a source shot. The second main source 140 can generate a source shot. The second main source 140 can be an electrical source. The second main source 140 can be an acoustic source. The second main source 140 can generate acoustic waves. The second main source 140 can generate an acoustic signal to be received by the receiver array 105. The second main source 140 can generate low frequency waves (e.g., 50 Hz). The second main source 140 can include a first float of the second main source 122, a second float of the second main source 124, and a third float of the second main source 126. The distance 325 between the first main source 135 and the second main source 140 can be between 50 and 70 meters. For example, the distance 325 between the first main source 135 and the second main source 140 can be 62.5 meters.

The first streamer 110 can couple with the first float of the first main source 112. The first float of the first main source 112 can include a plurality of air guns. The plurality of air guns can be coupled to the first float of the first main source 112. The plurality of air guns can be coupled to the first float of the first main source 112 by a plurality of gun chains. The first float of the first main source 112 can be coupled to the receiver array 105. The first float of the first main source 112 can be coupled to the vessel 102. The first float of the first main source 112 can be coupled to the vessel 102 by a gun string. The first float of the first main source 112 can include a plurality of gun plates. The plurality of air guns can be coupled to the plurality of gun plates.

The second streamer 115 can couple with the first float of the second main source 122. The first float of the second main source 122 can include a plurality of air guns. The plurality of air guns can be coupled to the first float of the second main source 122. The plurality of air guns can be coupled to the first float of the second main source 122 by a plurality of gun chains. The first float of the second main source 122 can be coupled to the receiver array 105. The first float of the second main source 122 can be coupled to the vessel 102. The first float of the second main source 122 can be coupled to the vessel 102 by a gun string. The first float of the second main source 122 can include a plurality of gun plates. The plurality of air guns can be coupled to the plurality of gun plates.

The third streamer 205 can couple with the third float of the first main source 116. The third float of the first main source 116 can include a plurality of air guns. The plurality of air guns can be coupled to the third float of the first main source 116. The plurality of air guns can be coupled to the third float of the first main source 116 by a plurality of gun chains. The third float of the first main source 116 can be coupled to the receiver array 105. The third float of the first main source 116 can be coupled to the vessel 102. The third float of the first main source 116 can be coupled to the vessel 102 by a gun string. The third float of the first main source 116 can include a plurality of gun plates. The plurality of air guns can be coupled to the plurality of gun plates.

The fourth streamer 210 can couple with the third float of the second main source 126. The second main source 140 can include a third float of the second main source 126. The third float of the second main source 126 can include a plurality of air guns. The plurality of air guns can be coupled to the third float of the second main source 126. The plurality of air guns can be coupled to the third float of the second main source 126 by a plurality of gun chains. The third float of the second main source 126 can be coupled to the receiver array 105. The third float of the second main source 126 can be coupled to the vessel 102. The third float of the second main source 126 can be coupled to the vessel 102 by a gun string. The third float of the second main source 126 can include a plurality of gun plates. The plurality of air guns can be coupled to the plurality of gun plates. The distance 325 between the first float of the first main source 112 and the first float of the second main source 122 can be between 50 and 70 meters. For example, the distance 325 between the first float of the first main source 112 and the first float of the second main source 122 can be 62.5 meters.

The seismic survey system 100 can include an accessory source array 145. The accessory source array 145 can generate an acoustic signal to be received by the receiver array 105. The accessory source array 145 can generate high frequency waves (e.g., greater than 1000 Hz, greater than 1500 Hz). The accessory source array 145 can generate waves at a different frequency than wave generated by the main source array 130. For example, the accessory source array 145 can generate waves at a higher frequency than the frequency of the waves generated by the main source array 130. The accessory source array 145 can generate waves at a lower frequency than the frequency of the waves generated by the main source array 130. The accessory source array 145 can include a first accessory source 150, a second accessory source 160, a third accessory source 405, and a fourth accessory source 410. The first accessory source 150 can couple with the first main source 135. The first accessory source 150 can be coupled with the main source array 130. The first accessory source 150 can be directly coupled with the main source array 130. For example, the first accessory source 150 can be mounted on the first main source 135. The first accessory source 150 can be removably attached to the first main source 135.

The first accessory source 150 can generate a source shot. The first accessory source 150 can generate acoustic waves. The first accessory source 150 can generate an acoustic signal to be received by the receiver array 105. The first accessory source 150 can generate high frequency waves (e.g., greater than 1000 Hz, greater than 1500 Hz). The first accessory source 150 can generate waves at a higher frequency than the frequency of the waves generated by the main source array 130. For example, the first accessory source 150 can generate waves at a higher frequency than the frequency of the waves generated by the first main source 135. The first accessory source 150 can generate waves at a higher frequency than the frequency of the waves generated by the second main source 140. The first accessory source 150 can generate waves at a lower frequency than the frequency of the waves generated by the main source array 130. For example, the first accessory source 150 can generate waves at a lower frequency than the frequency of the waves generated by the first main source 135. The first accessory source 150 can generate waves at a lower frequency than the frequency of the waves generated by the second main source 140. The first accessory source 150 can couple with the first float of the first main source 112. The first accessory source 150 can be mounted on the first float of the first main source 112. The first accessory source 150 can be removably attached to the first float of the first main source 112.

The second accessory source 160 can couple with the second main source 140. The second accessory source 160 can be coupled with the main source array 130. The second accessory source 160 can be directly coupled with the main source array 130. For example, the second accessory source 160 can be mounted on the second main source 140. The second accessory source 160 can be removably attached to the second main source 140. The second accessory source 160 can generate a source shot. The second accessory source 160 can generate acoustic waves. The second accessory source 160 can generate an acoustic signal to be received by the receiver array 105. The second accessory source 160 can generate high frequency waves (e.g., greater than 1000 Hz, greater than 1500 Hz). The second accessory source 160 can generate waves at a higher frequency than the frequency of the waves generated by the main source array 130. For example, the second accessory source 160 can generate waves at a higher frequency than the frequency of the waves generated by the first main source 135. The second accessory source 160 can generate waves at a higher frequency than the frequency of the waves generated by the second main source 140. The second accessory source 160 can generate waves at a lower frequency than the frequency of the waves generated by the main source array 130. For example, the second accessory source 160 can generate waves at a lower frequency than the frequency of the waves generated by the first main source 135. The second accessory source 160 can generate waves at a lower frequency than the frequency of the waves generated by the second main source 140. The second accessory source 160 can couple with the first float of the second main source 122. The second accessory source 160 can be mounted on the first float of the second main source 122. The second accessory source 160 can be removably attached to the first float of the second main source 122.

The third accessory source 405 can couple with the first lateral cable 165. The first lateral cable 165 can couple with a first diverter 170. The first lateral cable 165 can couple with the first main source 135. The first lateral cable 165 may be a cable (e.g., a surface marine cable), an assembly of wires, a tether, or a rope. The first lateral cable 165 can couple to the first diverter 170 through a secondary cable. The first lateral cable 165 may be a power cable to transmit electrical power from the vessel 102 to the first main source 135. The third accessory source 405 can couple with the first lateral cable 165 closer to the first main source 135 than to the first diverter 170. The distance 605 between the first accessory source 150 and the third accessory source 405 can be between 30 and 40 meters. For example, the distance 605 between the first accessory source 150 and the third accessory source 405 can be 37.5 meters.

The fourth accessory source 410 can couple with the second lateral cable 175. The second lateral cable 175 can couple with a second diverter 180. The second lateral cable 175 can couple with the second main source 140. The second lateral cable 175 may be a cable (e.g., a surface marine cable), an assembly of wires, a tether, or a rope. The second lateral cable 175 can couple to the second diverter 180 through a secondary cable. The second lateral cable 175 may be a power cable to transmit electrical power from the vessel 102 to the second main source 140. The fourth accessory source 410 can couple with the second lateral cable 175 closer to the second main source 140 than to the second diverter 180. The distance 610 between the second accessory source 160 and the fourth accessory source 410 can be between 30 and 40 meters. For example, the distance 610 between the second accessory source 160 and the fourth accessory source 410 can be 37.5 meters.

The seismic survey system 100 can include a power cable 190. The power cable 190 can provide power to the main source array 130. For example, the power cable 190 may be a power cable to transmit electrical power from the vessel 102 to the main source array 130. The power cable 190 may be a power cable to transmit electrical power from the first lateral cable 165 to the main source array 130. The power cable 190 can provide power to the accessory source array 145. For example, the power cable 190 may be a power cable to transmit electrical power from the vessel 102 to the accessory source array 145. The power cable 190 may be a power cable to transmit electrical power from the first lateral cable 165 to the accessory source array 145. The power cable 190 may be multiple power cables. The power cable 190 may be a power cable to transmit electrical power from the vessel 102 to the first accessory source 150. The power cable 190 may be a power cable to transmit electrical power from the vessel 102 to the second accessory source 160. The power cable 190 may be a power cable to transmit electrical power from the vessel 102 to the third accessory source 405. The power cable 190 may be a power cable to transmit electrical power from the vessel 102 to the fourth accessory source 410.

Figure 7:
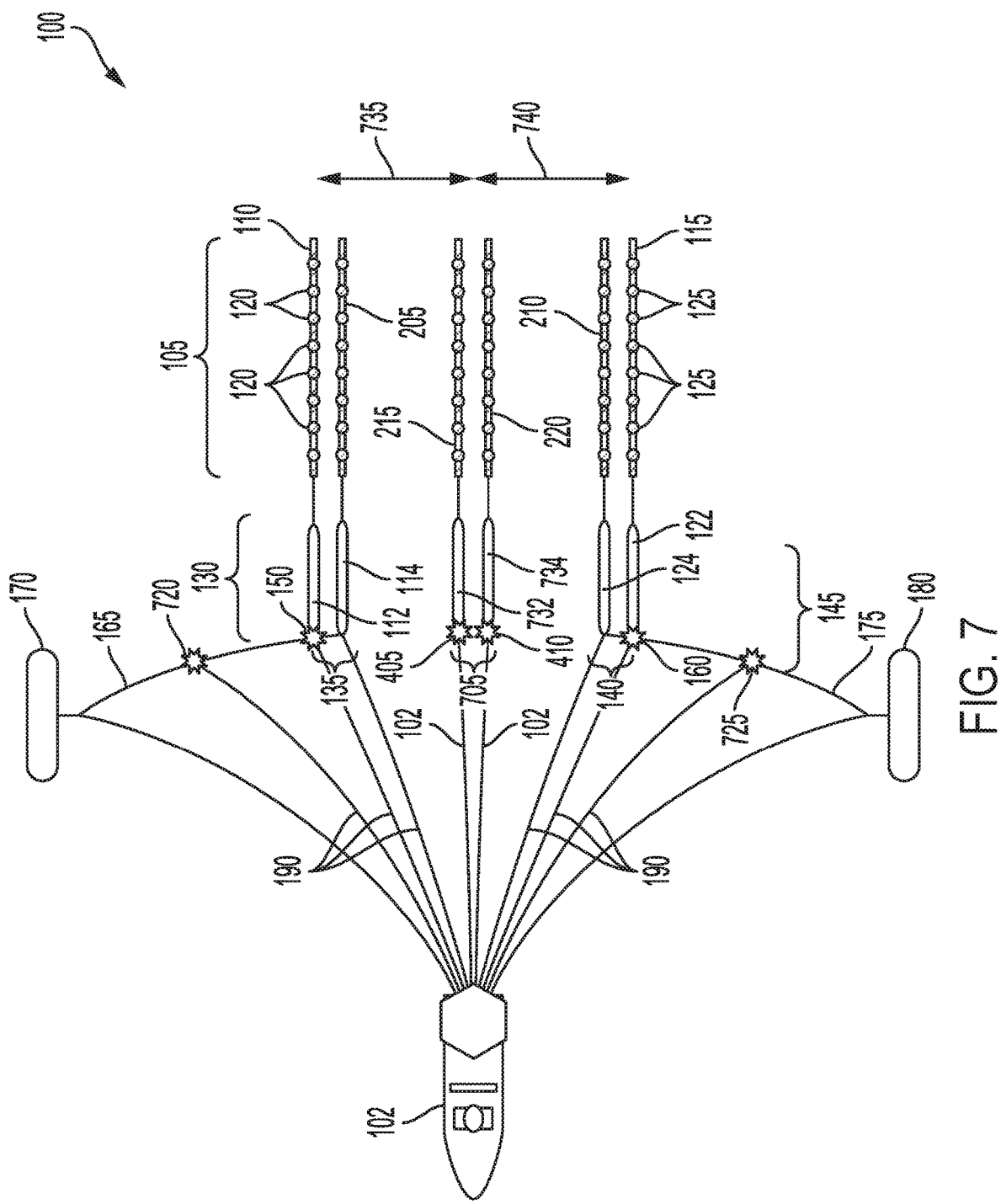
FIG. 7 illustrates a seismic survey system according to an example implementation.

FIG. 7 illustrates an example seismic survey system 100. The seismic survey system 100 can include a receiver array 105. The receiver array 105 can include a first streamer 110. The receiver array 105 can include a second streamer 115. The receiver array 105 can include a third streamer 205. The receiver array 105 can include a fourth streamer 210. The receiver array 105 can include a fifth streamer 215. The receiver array 105 can include a sixth streamer 220. The first streamer 110 may be a cable (e.g., a surface marine cable), an assembly of wires, or any component capable of connecting a receiver to a recording device which may be located on a vessel 102. The second streamer 115 may be a cable (e.g., a surface marine cable), an assembly of wires, or any component capable of connecting a receiver to a recording device which may be located on a vessel 102. The third streamer 205 may be a cable (e.g., a surface marine cable), an assembly of wires, or any component capable of connecting a receiver to a recording device which may be located on a vessel 102. The fourth streamer 210 may be a cable (e.g., a surface marine cable), an assembly of wires, or any component capable of connecting a receiver to a recording device which may be located on a vessel 102. The fifth streamer 215 may be a cable (e.g., a surface marine cable), an assembly of wires, or any component capable of connecting a receiver to a recording device which may be located on a vessel 102. The sixth streamer 220 may be a cable (e.g., a surface marine cable), an assembly of wires, or any component capable of connecting a receiver to a recording device which may be located on a vessel 102.

The seismic survey system 100 can include a first plurality of receivers 120. The first plurality of receivers 120 can be coupled with the first streamer 110. The first plurality of receivers 120 can be disposed on the first streamer 110. The first plurality of receivers 120 can be coupled to the first streamer 110 along a line. The first plurality of receivers 120 can be evenly spaced along the first streamer 110. The first plurality of receivers 120 can receive reflection data reflected off an object in a seabed. For example, a receiver of the first plurality of receivers 120 may be a hydrophone or any other device capable of collecting seismic data. Seismic data can include reflection data indicating subsurface features of the seabed. Seismic data can include reflection data indicating features on the seabed. The first plurality of receivers 120 can be configured to detect acoustic waves that are reflected by seabed objects. The seabed objects can be completely buried within the seabed. The seabed objects can be partially buried within the seabed. The first plurality of receivers 120 can receive reflection data indicating fluid escape from pipes on or below the seabed. The first plurality of receivers 120 can receive reflection data indicating gas escape from pipes on or below the seabed.

The seismic survey system 100 can include a second plurality of receivers 125. The second plurality of receivers 125 can be coupled with the second streamer 115. The second plurality of receivers 125 can be disposed on the second streamer 115. The second plurality of receivers 125 can be coupled to the second streamer 115 along a line. The second plurality of receivers 125 can be evenly spaced along the second streamer 115. The second plurality of receivers 125 can receive reflection data reflected off an object in a seabed. For example, a receiver of the second plurality of receivers 125 may be a hydrophone or any other device capable of collecting seismic data. Seismic data can include reflection data indicating subsurface features of the seabed. Seismic data can include reflection data indicating features on the seabed. The second plurality of receivers 125 can be configured to detect acoustic waves that are reflected by seabed objects. The seabed objects can be completely buried within the seabed. The seabed objects can be partially buried within the seabed. The second plurality of receivers 125 can receive reflection data indicating fluid escape from pipes on or below the seabed. The second plurality of receivers 125 can receive reflection data indicating gas escape from pipes on or below the seabed.

The seismic survey system 100 can include a main source array 130. The main source array 130 can generate an acoustic signal to be received by the receiver array 105. The main source array 130 can generate low frequency waves (e.g., 50 Hz). The main source array 130 can include a first main source 135. The first main source 135 can generate a source shot. The first main source 135 can be an electrical source. The first main source 135 can be an acoustic source. The first main source 135 can generate acoustic waves. The first main source 135 can generate an acoustic signal to be received by the receiver array 105. The first main source 135 can generate low frequency waves (e.g., 50 Hz). The first main source 135 can include a first float of the first main source 112 and a second float of the first main source 114.

The main source array 130 can include a second main source 140. The second main source 140 can generate a source shot. The second main source 140 can generate a source shot. The second main source 140 can be an electrical source. The second main source 140 can be an acoustic source. The second main source 140 can generate acoustic waves. The second main source 140 can generate an acoustic signal to be received by the receiver array 105. The second main source 140 can generate low frequency waves (e.g., 50 Hz). The second main source 140 can include a first float of the second main source 122 and a second float of the second main source 124.

The main source array 130 can include a third main source 705. The third main source 705 can generate a source shot. The third main source 705 can generate acoustic waves. The third main source 705 can generate an acoustic signal to be received by the receiver array 105. The third main source 705 can generate low frequency waves (e.g., 50 Hz). The third main source 705 can include a first float of the third main source 732 and a second float of the third main source 734. The distance 735 between the first main source 135 and the third main source 705 can be between 50 and 70 meters. For example, the distance 735 between the first main source 135 and the third main source 705 can be 62.5 meters. The distance 740 between the second main source 140 and the third main source 705 can be between 50 and 70 meters. For example, the distance 740 between the second main source 140 and the third main source 705 can be 62.5 meters.

The first streamer 110 can couple with the first float of the first main source 112. The first float of the first main source 112 can include a plurality of air guns. The plurality of air guns can be coupled to the first float of the first main source 112. The plurality of air guns can be coupled to the first float of the first main source 112 by a plurality of gun chains. The first float of the first main source 112 can be coupled to the receiver array 105. The first float of the first main source 112 can be coupled to the vessel 102. The first float of the first main source 112 can be coupled to the vessel 102 by a gun string. The first float of the first main source 112 can include a plurality of gun plates. The plurality of air guns can be coupled to the plurality of gun plates.

The second streamer 115 can couple with the first float of the second main source 122. The first float of the second main source 122 can include a plurality of air guns. The plurality of air guns can be coupled to the first float of the second main source 122. The plurality of air guns can be coupled to the first float of the second main source 122 by a plurality of gun chains. The first float of the second main source 122 can be coupled to the receiver array 105. The first float of the second main source 122 can be coupled to the vessel 102. The first float of the second main source 122 can be coupled to the vessel 102 by a gun string. The first float of the second main source 122 can include a plurality of gun plates. The plurality of air guns can be coupled to the plurality of gun plates.

The third streamer 205 can couple with the second float of the first main source 114. The second float of the first main source 114 can include a plurality of air guns. The plurality of air guns can be coupled to the second float of the first main source 114. The plurality of air guns can be coupled to the second float of the first main source 114 by a plurality of gun chains. The second float of the first main source 114 can be coupled to the receiver array 105. The second float of the first main source 114 can be coupled to the vessel 102. The second float of the first main source 114 can be coupled to the vessel 102 by a gun string. The second float of the first main source 114 can include a plurality of gun plates. The plurality of air guns can be coupled to the plurality of gun plates.

The fourth streamer 210 can couple with the second float of the second main source 124. The second main source 140 can include a second float of the second main source 124. The second float of the second main source 124 can include a plurality of air guns. The plurality of air guns can be coupled to the second float of the second main source 124. The plurality of air guns can be coupled to the second float of the second main source 124 by a plurality of gun chains. The second float of the second main source 124 can be coupled to the receiver array 105. The second float of the second main source 124 can be coupled to the vessel 102. The second float of the second main source 124 can be coupled to the vessel 102 by a gun string. The second float of the second main source 124 can include a plurality of gun plates. The plurality of air guns can be coupled to the plurality of gun plates.

The fifth streamer 215 can couple with the first float of the third main source 732. The first float of the third main source 732 can include a plurality of air guns. The plurality of air guns can be coupled to the first float of the third main source 732. The plurality of air guns can be coupled to the first float of the third main source 732 by a plurality of gun chains. The first float of the third main source 732 can be coupled to the receiver array 105. The first float of the third main source 732 can be coupled to the vessel 102. The first float of the third main source 732 can be coupled to the vessel 102 by a gun string. The first float of the third main source 732 can include a plurality of gun plates. The plurality of air guns can be coupled to the plurality of gun plates.

The sixth streamer 220 can couple with the second float of the third main source 734. The second main source 140 can include a second float of the third main source 734. The second float of the third main source 734 can include a plurality of air guns. The plurality of air guns can be coupled to the second float of the third main source 734. The plurality of air guns can be coupled to the second float of the third main source 734 by a plurality of gun chains. The second float of the third main source 734 can be coupled to the receiver array 105. The second float of the third main source 734 can be coupled to the vessel 102. The second float of the third main source 734 can be coupled to the vessel 102 by a gun string. The second float of the third main source 734 can include a plurality of gun plates. The plurality of air guns can be coupled to the plurality of gun plates.

The seismic survey system 100 can include an accessory source array 145. The accessory source array 145 can generate an acoustic signal to be received by the receiver array 105. The accessory source array 145 can generate high frequency waves (e.g., greater than 1000 Hz, greater than 1500 Hz). The accessory source array 145 can generate waves at a different frequency than wave generated by the main source array 130. For example, the accessory source array 145 can generate waves at a higher frequency than the frequency of the waves generated by the main source array 130. The accessory source array 145 can generate waves at a lower frequency than the frequency of the waves generated by the main source array 130. The accessory source array 145 can include a first accessory source 150, a second accessory source 160, a third accessory source 405, a fourth accessory source 410, a fifth accessory source 720, and a sixth accessory source 725. The first accessory source 150 can couple with the first main source 135. The first accessory source 150 can be coupled with the main source array 130.

The first accessory source 150 can be directly coupled with the main source array 130. For example, the first accessory source 150 can be mounted on the first main source 135. The first accessory source 150 can be removably attached to the first main source 135.

The first accessory source 150 can generate a source shot. The first accessory source 150 can generate acoustic waves. The first accessory source 150 can generate an acoustic signal to be received by the receiver array 105. The first accessory source 150 can generate high frequency waves (e.g., greater than 1000 Hz, greater than 1500 Hz). The first accessory source 150 can generate waves at a higher frequency than the frequency of the waves generated by the main source array 130. For example, the first accessory source 150 can generate waves at a higher frequency than the frequency of the waves generated by the first main source 135. The first accessory source 150 can generate waves at a higher frequency than the frequency of the waves generated by the second main source 140. The first accessory source 150 can generate waves at a lower frequency than the frequency of the waves generated by the main source array 130. For example, the first accessory source 150 can generate waves at a lower frequency than the frequency of the waves generated by the first main source 135. The first accessory source 150 can generate waves at a lower frequency than the frequency of the waves generated by the second main source 140. The first accessory source 150 can couple with the first float of the first main source 112. The first accessory source 150 can be mounted on the first float of the first main source 112. The first accessory source 150 can be removably attached to the first float of the first main source 112. The first accessory source 150 can couple with the second float of the first main source 114. The first accessory source 150 can be mounted on the second float of the first main source 114. The first accessory source 150 can be removably attached to the second float of the first main source 114.

The second accessory source 160 can couple with the second main source 140. The second accessory source 160 can be coupled with the main source array 130. The second accessory source 160 can be directly coupled with the main source array 130. For example, the second accessory source 160 can be mounted on the second main source 140. The second accessory source 160 can be removably attached to the second main source 140. The second accessory source 160 can generate a source shot. The second accessory source 160 can generate acoustic waves. The second accessory source 160 can generate an acoustic signal to be received by the receiver array 105. The second accessory source 160 can generate high frequency waves (e.g., greater than 1000 Hz, greater than 1500 Hz). The second accessory source 160 can generate waves at a higher frequency than the frequency of the waves generated by the main source array 130. For example, the second accessory source 160 can generate waves at a higher frequency than the frequency of the waves generated by the first main source 135. The second accessory source 160 can generate waves at a higher frequency than the frequency of the waves generated by the second main source 140. The second accessory source 160 can generate waves at a lower frequency than the frequency of the waves generated by the main source array 130. For example, the second accessory source 160 can generate waves at a lower frequency than the frequency of the waves generated by the first main source 135. The second accessory source 160 can generate waves at a lower frequency than the frequency of the waves generated by the second main source 140. The second accessory source 160 can couple with the first float of the second main source 122. The second accessory source 160 can be mounted on the first float of the second main source 122. The second accessory source 160 can be removably attached to the first float of the second main source 122. The second accessory source 160 can couple with the second float of the second main source 124. The second accessory source 160 can be mounted on the second float of the second main source 124. The second accessory source 160 can be removably attached to the second float of the second main source 124.

The third accessory source 405 can couple with the third main source 705. The third accessory source 405 can be mounted on the third main source 705. The third accessory source 405 can be removably attached to the third main source 705. The third accessory source 405 can generate a source shot. The third accessory source 405 can generate acoustic waves. The third accessory source 405 can generate an acoustic signal to be received by the receiver array 105. The third accessory source 405 can generate high frequency waves (e.g., greater than 1000 Hz, greater than 1500 Hz). The third accessory source 405 can couple with the first float of the third main source 732. The third accessory source 405 can be mounted on the first float of the third main source 732. The third accessory source 405 can be removably attached to the first float of the third main source 732.

The fourth accessory source 410 can couple with the third main source 705. The fourth accessory source 410 can be mounted on the third main source 705. The fourth accessory source 410 can be removably attached to the third main source 705. The third accessory source 405 can generate a source shot. The fourth accessory source 410 can generate acoustic waves. The fourth accessory source 410 can generate an acoustic signal to be received by the receiver array 105. The fourth accessory source 410 can generate high frequency waves (e.g., greater than 1000 Hz, greater than 1500 Hz). The fourth accessory source 410 can couple with the second float of the third main source 734. The fourth accessory source 410 can be mounted on the second float of the third main source 734. The fourth accessory source 410 can be removably attached to the second float of the third main source 734.

The fifth accessory source 720 can couple with the first lateral cable 165. The first lateral cable 165 can couple with a first diverter 170. The first lateral cable 165 can couple with the first main source 135. The first lateral cable 165 may be a cable (e.g., a surface marine cable), an assembly of wires, a tether, or a rope. The first lateral cable 165 can couple to the first diverter 170 through a secondary cable. The first lateral cable 165 may be a power cable to transmit electrical power from the vessel 102 to the first main source 135. The fifth accessory source 720 can couple with the first lateral cable 165 closer to the first main source 135 than to the first diverter 170.

The sixth accessory source 725 can couple with the second lateral cable 175. The second lateral cable 175 can couple with a second diverter 180. The second lateral cable 175 can couple with the second main source 140. The second lateral cable 175 may be a cable (e.g., a surface marine cable), an assembly of wires, a tether, or a rope. The second lateral cable 175 can couple to the second diverter 180 through a secondary cable. The second lateral cable 175 may be a power cable to transmit electrical power from the vessel 102 to the second main source 140. The sixth accessory source 725 can couple with the second lateral cable 175 closer to the second main source 140 than to the second diverter 180.

The seismic survey system 100 can include a power cable 190. The power cable 190 can provide power to the main source array 130. For example, the power cable 190 may be a power cable to transmit electrical power from the vessel 102 to the main source array 130. The power cable 190 may be a power cable to transmit electrical power from the first lateral cable 165 to the main source array 130. The power cable 190 can provide power to the accessory source array 145. For example, the power cable 190 may be a power cable to transmit electrical power from the vessel 102 to the accessory source array 145. The power cable 190 may be a power cable to transmit electrical power from the first lateral cable 165 to the accessory source array 145. The power cable 190 may be multiple power cables. The power cable 190 may be a power cable to transmit electrical power from the vessel 102 to the first accessory source 150. The power cable 190 may be a power cable to transmit electrical power from the vessel 102 to the second accessory source 160. The power cable 190 may be a power cable to transmit electrical power from the vessel 102 to the third accessory source 405. The power cable 190 may be a power cable to transmit electrical power from the vessel 102 to the fourth accessory source 410. The power cable 190 may be a power cable to transmit electrical power from the vessel 102 to the fifth accessory source 720. The power cable 190 may be a power cable to transmit electrical power from the vessel 102 to the sixth accessory source 725.

Figure 8:
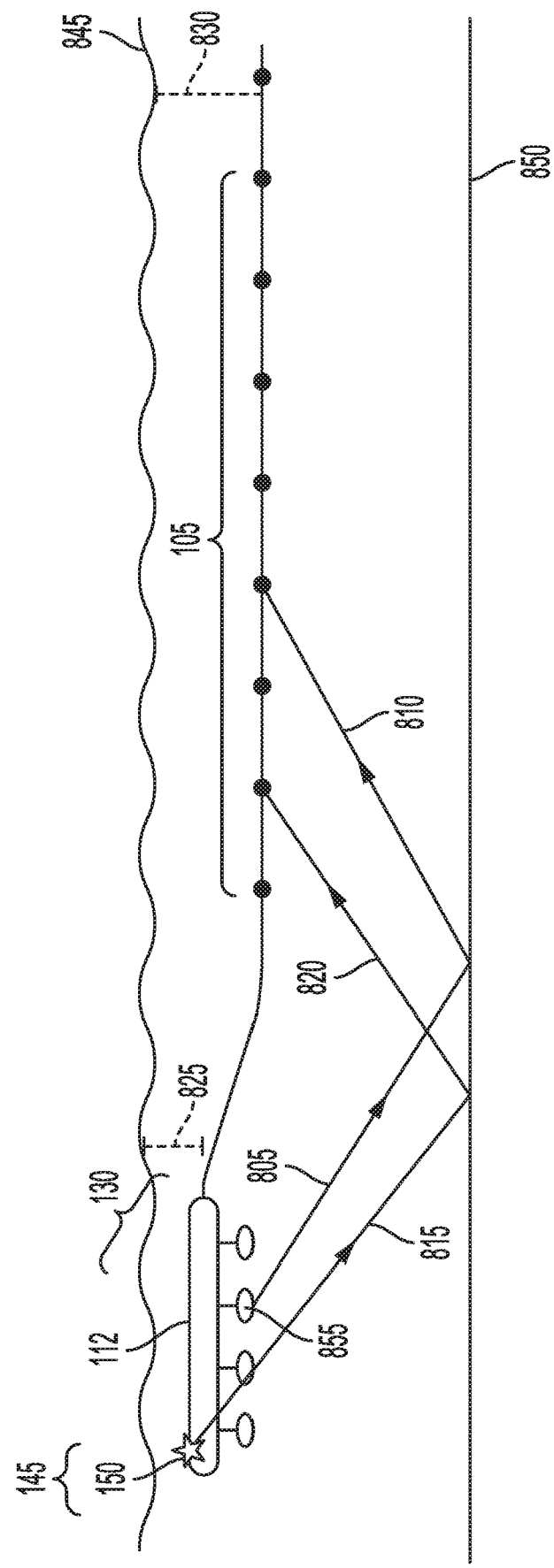
FIG. 8 illustrates a seismic survey system according to an example implementation.

FIG. 8 illustrates an example seismic survey system 100. The seismic survey system 100 can include a main source array 130. The main source array can include a first main source 135. The first main source 135 can include a first float of the first main source 112. The first float of the first main source 112 can include an air gun 855. The main source array 130 can generate an acoustic signal. The acoustic signal generated by main source array 130 can be a main source shot 805. The air gun 855 can generate an acoustic signal. The acoustic signal generated by air gun 855 can be a main source shot 805. The main source array 130 can be disposed at a first depth 825 of a body of water. The main source array 130 can be disposed at a first depth 825 below a sea surface 845. The first depth 825 can be between 5 meters and 15 meters below the sea surface 845. The first depth 825 can be less than 5 meters below the sea surface 845. The first depth 825 can be greater than 15 meters below the sea surface 845.

The seismic survey system 100 can include an accessory source array 145. The accessory source array 145 can include a first accessory source 150. The first accessory source 150 can generate an acoustic signal. The acoustic signal generated by the first accessory source 150 can be an accessory source shot 815. The first accessory source 150 can generate an accessory source shot 815. The accessory source array 145 can be disposed at a first depth 825 of a body of water. The accessory source array 145 can be disposed at a first depth 825 below sea surface 845. The first depth 825 can be between 0.5 meters and 20 meters below the sea surface 845. The first depth 825 can be less than 0.5 meters below the sea surface 845. The first depth 825 can be greater than 20 meters below the sea surface 845. The accessory source array 145 can be towed at the same depth as the main source array 130.

The seismic survey system 100 can include a receiver array 105. The receiver array 105 can be disposed at a second depth 830 of the body of water. The receiver array 105 can be disposed at a second depth 830 below the sea surface 845. The second depth 830 can be between 0.5 meters and 20 meters below the sea surface 845. The second depth 830 can be shallower than the first depth 825. The second depth 830 can be deeper than the first depth 825. The second depth 830 can be less than 0.5 meters below the sea surface 845. The second depth 830 can be greater than 20 meters below the sea surface 845.

The receiver array 105 can receive reflection data generated by the acoustic signal. The main source shot 805 can reflect off a seabed 850. Reflection data from reflected off the seabed 850 from the main source shot 805 can be main source shot reflection data 810. The main source shot reflection data 810 can be refection data generated by the acoustic signal from the main source shot 805. The receiver array 105 can receive the main source shot reflection data 810. The accessory source shot 815 can reflect off the seabed 850. Reflection data from reflected off the seabed 850 from the accessory source shot 815 can be accessory source shot reflection data 820. The accessory source shot reflection data 820 can be refection data generated by the acoustic signal from accessory source shot 815. The receiver array 105 can receive the accessory source shot reflection data 820.

Figure 9:
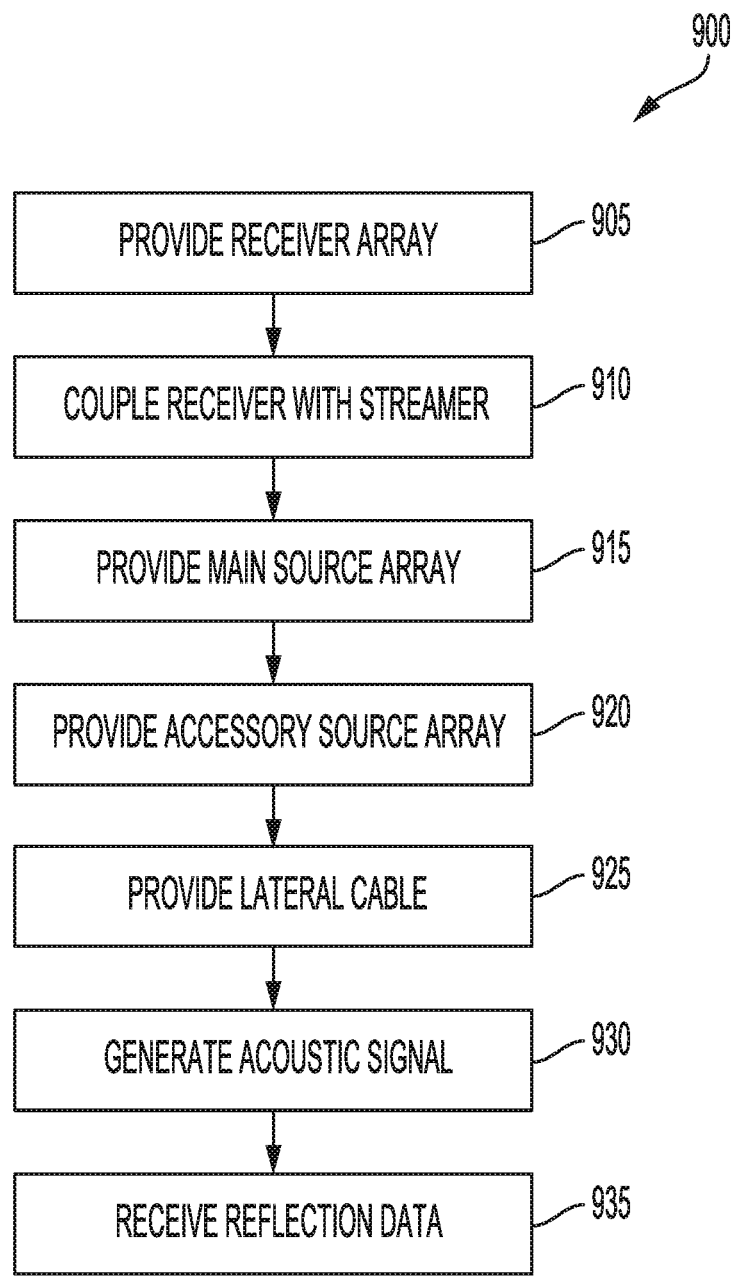
FIG. 9 illustrates a method of seismic surveying according to an example implementation.

FIG. 9 illustrates a method of seismic surveying according to an embodiment. In brief summary, the method 900 can include providing a receiver array (BLOCK 905). The method 900 can include coupling a receiver with a streamer (BLOCK 910). The method 900 can include providing a main source array (BLOCK 915). The method 900 can include providing an accessory source array (BLOCK 920). The method 900 can include providing a lateral cable (BLOCK 925). The method 900 can include generating an acoustic signal (BLOCK 930). The method 900 can include receiving reflection data (BLOCK 935).

The method 900 can include providing a receiver array (BLOCK 905). The method can include providing a receiver array including a first streamer. The method can include providing a receiver array including a second streamer. The method can include providing the receiver array including a third streamer. The method can include providing the receiver array including and a fourth streamer.

The method 900 can include coupling a receiver with a streamer (BLOCK 910). The method can include coupling a first plurality of receivers with the first streamer. The method can include coupling a second plurality of receivers with the second streamer. The method can include coupling the first streamer with the first float of the first main source. The method can include coupling the second streamer with the first float of the second main source. The method can include coupling the third streamer with the third float of the first main source. The method can include coupling the fourth streamer with the third float of the second main source.

The method 900 can include providing a main source array (BLOCK 915). The method can include providing a main source array including a first main source. The method can include providing a main source array including a second main source. The method can include providing the first main source including a first float of the first main source, a second float of the first main source, and a third float of the first main source. The method can include providing the second main source including a first float of the second main source, a second float of the second main source, and a third float of the second main source.

The method 900 can include providing an accessory source array (BLOCK 920). The method can include providing an accessory source array including a first accessory source. The method can include providing an accessory source array including a second accessory source. The first accessory source can couple with the first main source. The second accessory source can couple with the second main source. The method can include coupling the first accessory source with the first float of the first main source. The method can include coupling the second accessory source with the first float of the second main source. The method can include providing the accessory source array including a third accessory source and a fourth accessory source. The method can include coupling the third accessory source with the first lateral cable. The method can include coupling the fourth accessory source with the second lateral cable The method 900 can include providing a lateral cable (BLOCK 925). The method can include providing a first lateral cable to couple with a first diverter. The method can include providing a first lateral cable to couple with the first main source. The method can include providing a second lateral cable to couple with a second diverter. The method can include providing a second lateral cable to couple with the second main source.

The method 900 can include generating an acoustic signal (BLOCK 930). The method can include generating, by the main source array, an acoustic signal. The method can include generating, by the accessory source array, an acoustic signal.

The method 900 can include receiving reflection data (BLOCK 935). The method can include receiving, by the receiver array, reflection data generated by the acoustic signal. The method can include receiving, by the receiver array, reflection data generated by the acoustic signal.

The method 900 can include towing, by a vessel, the receiver array, the main source array, and the accessory source array in a tow direction. The method can include towing, by the vessel, the main source array ahead of the receiver array. The method can include towing, by the vessel, the accessory source array ahead of the receiver array. The method can include towing, the by the vessel, the accessory source array behind the main source array. The method can include towing, the by the vessel, the accessory source array ahead of the main source array. The method 900 can include disposing the main source array at a first depth of a body of water. The method can include disposing the receiver array at a second depth of the body of water. The second depth can be deeper than the first depth.

Figure 10:
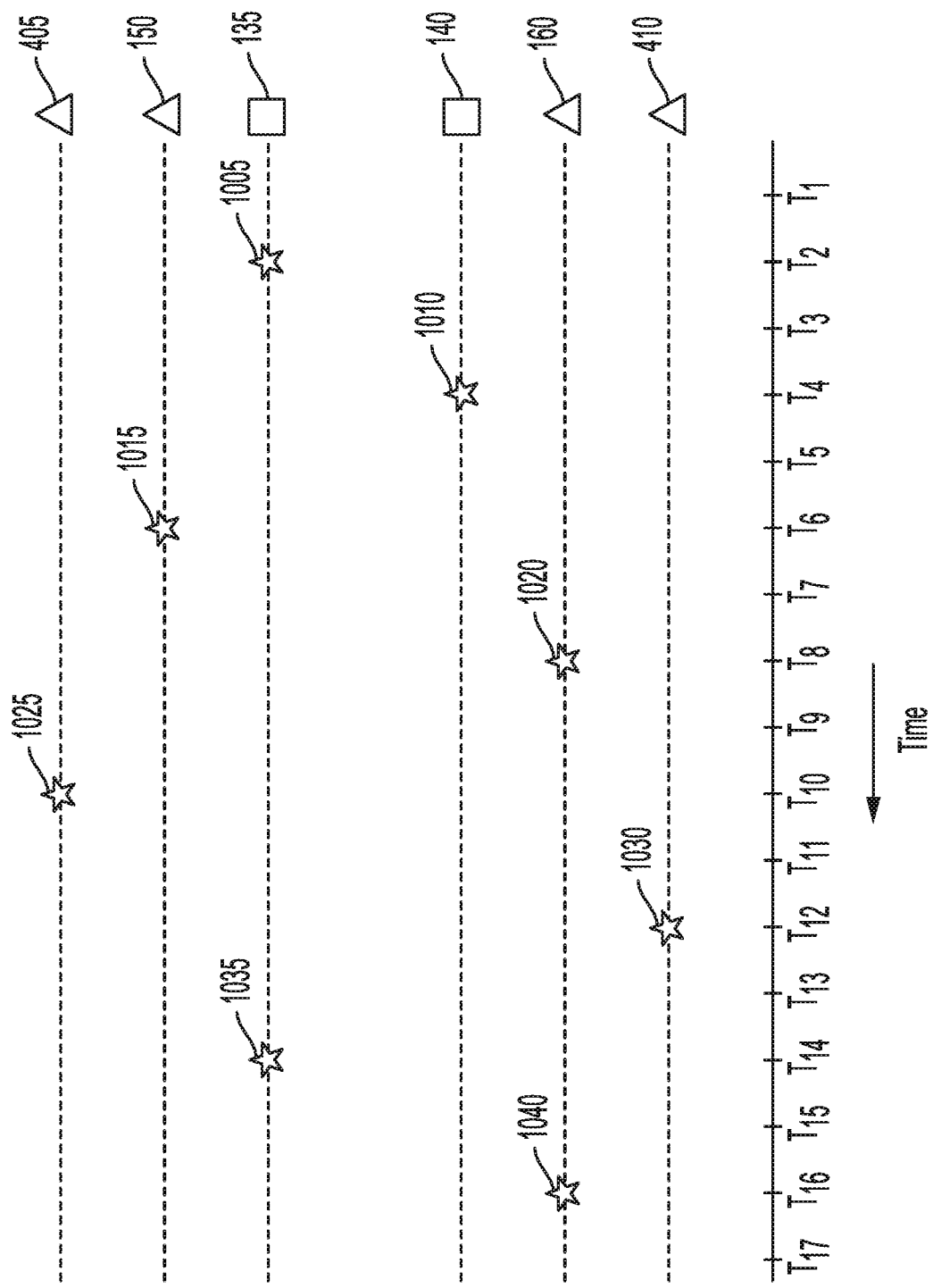
FIG. 10 illustrates a seismic survey system according to an example implementation.

FIG. 10 illustrates an example seismic survey system 100. The seismic survey system 100 can include a first main source 135. The seismic survey system 100 can include a second main source 140. The seismic survey system 100 can include a first accessory source 150. The seismic survey system 100 can include a second accessory source 160. The seismic survey system 100 can include a third accessory source 405. The seismic survey system 100 can include a fourth accessory source 410. The first accessory source 150 can couple with the first main source 135. The second accessory source 160 can couple with the second main source 140.

The seismic survey system 100 can include a data processing system 1200 described herein. The data processing system 1200 can have one or more processors 1210. The data processing system 1200 can initiate a first source shot of the first main source 1005. For example, the data processing system 1200 can initiate the first source shot of the first main source 1005 at time $T_2$. The data processing system 1200 can initiate the first source shot of the first main source 1005 prior to initiating any other source shots. The data processing system 1200 can initiate the first source shot of the first main source 1005 at a first time. The data processing system 1200 can initiate a second source shot of the first main source 1035. For example, the data processing system 1200 can initiate the second source shot of the first main source 1035 at time $T_{14}$.

The data processing system 1200 can initiate a first source shot of the second main source 1010. For example, the data processing system 1200 can initiate the first source shot of the second main source 1010 at time $T_4$. The data processing system 1200 can initiate the first source shot of the second main source 1010 subsequent to initiating the first source shot of the first main source 1005. The data processing system 1200 can initiate the first source shot of the second main source 1010 at a second time. The second time can be subsequent to the first time. The data processing system 1200 can initiate a second source shot of the second main source 1040. For example, the data processing system 1200 can initiate the second source shot of the second main source 1040 at time $T_{16}$.

The data processing system 1200 can initiate the first source shot of the first main source 1005 according to a main source initiation cycle. The main source initiation cycle can include predetermined source firing times for main source shots. Main source shots can include any source shots fired from main sources. The firing times for the main source initiation cycle can occur at a regular interval or regular frequency. The main source initiation cycle can have a first frequency. For example, the firing times for the main source initiation cycle can occur every 8-10 seconds. The firing times for the main source initiation cycle can occur at an irregular interval or irregular frequency. The data processing system 1200 can initiate the first source shot of the second main source 1010 according to the main source initiation cycle. can The data processing system 1200 can initiate the first source shot of the first main source 1005 at a first frequency. The data processing system 1200 can initiate the first source shot of the second main source 1010 at the first frequency. The first frequency can be a low frequency (e.g., 50 Hz).

The data processing system 1200 can initiate a first source shot of the first accessory source 1015. For example, the data processing system 1200 can initiate the first source shot of the first accessory source 1015 at time $T_6$. The data processing system 1200 can initiate the first source shot of the first accessory source 1015 subsequent to initiating the first source shot of the first main source 1005. The data processing system 1200 can initiate the first source shot of the first accessory source 1015 subsequent to initiating the first source shot of the second main source 1010. The data processing system 1200 can initiate the first source shot of the first accessory source 1015 prior to initiating the first source shot of the first main source 1005. The data processing system 1200 can initiate the first source shot of the first accessory source 1015 prior to initiating the first source shot of the second main source 1010. The data processing system 1200 can initiate a first source shot of the first accessory source 1015 at a third time. The third time can be subsequent to the first time. The third time can be prior to the second time.

The data processing system 1200 can initiate a first source shot of the second accessory source 1020. For example, the data processing system 1200 can initiate the first source shot of the second accessory source 1020 at time $T_8$. The data processing system 1200 can initiate the first source shot of the second accessory source 1020 subsequent to initiating the first source shot of the first main source 1005. The data processing system 1200 can initiate the first source shot of the second accessory source 1020 subsequent to initiating the first source shot of the second main source 1010. The data processing system 1200 can initiate the first source shot of the second accessory source 1020 subsequent to initiating the first source shot of the first accessory source 1015. The data processing system 1200 can initiate the first source shot of the second accessory source 1020 prior to initiating the first source shot of the first main source 1005. The data processing system 1200 can initiate the first source shot of the second accessory source 1020 prior to initiating the first source shot of the second main source 1010. The data processing system 1200 can initiate the first source shot of the second accessory source 1020 prior to initiating the first source shot of the first accessory source 1015. The data processing system 1200 can initiate the first source shot of the second accessory source 1020 at a fourth time. The fourth time can be subsequent to the second time.

The data processing system 1200 can initiate a first source shot of the third accessory source 1025. For example, the data processing system 1200 can initiate the first source shot of the third accessory source 1025 at time $T_{10}$. The data processing system 1200 can initiate the first source shot of the third accessory source 1025 subsequent to initiating the first source shot of the first main source 1005. The data processing system 1200 can initiate the first source shot of the third accessory source 1025 subsequent to initiating the first source shot of the second main source 1010. The data processing system 1200 can initiate the first source shot of the third accessory source 1025 subsequent to initiating the first source shot of the first accessory source 1015. The data processing system 1200 can initiate the first source shot of the third accessory source 1025 subsequent to initiating the first source shot of the second accessory source 1020. The data processing system 1200 can initiate the first source shot of the third accessory source 1025 prior to initiating the first source shot of the first main source 1005. The data processing system 1200 can initiate the first source shot of the third accessory source 1025 prior to initiating the first source shot of the second main source 1010. The data processing system 1200 can initiate the first source shot of the third accessory source 1025 prior to initiating the first source shot of the first accessory source 1015. The data processing system 1200 can initiate the first source shot of the third accessory source 1025 prior to initiating the first source shot of the second accessory source 1020. The data processing system 1200 can initiate the first source shot of the third accessory source 1025 at a fifth time.

The data processing system 1200 can initiate a first source shot of the fourth accessory source 1030. For example, the data processing system 1200 can initiate the first source shot of the fourth accessory source 1030 at time $T_{12}$. The data processing system 1200 can initiate the first source shot of the fourth accessory source 1030 subsequent to initiating the first source shot of the first main source 1005. The data processing system 1200 can initiate the first source shot of the fourth accessory source 1030 subsequent to initiating the first source shot of the second main source 1010. The data processing system 1200 can initiate the first source shot of the fourth accessory source 1030 subsequent to initiating the first source shot of the first accessory source 1015. The data processing system 1200 can initiate the first source shot of the fourth accessory source 1030 subsequent to initiating the first source shot of the second accessory source 1020. The data processing system 1200 can initiate the first source shot of the fourth accessory source 1030 subsequent to initiating the first source shot of the third accessory source 1025. The data processing system 1200 can initiate the first source shot of the fourth accessory source 1030 prior to initiating the first source shot of the first main source 1005. The data processing system 1200 can initiate the first source shot of the fourth accessory source 1030 prior to initiating the first source shot of the second main source 1010. The data processing system 1200 can initiate the first source shot of the fourth accessory source 1030 prior to initiating the first source shot of the first accessory source 1015. The data processing system 1200 can initiate the first source shot of the fourth accessory source 1030 prior to initiating the first source shot of the second accessory source 1020. The data processing system 1200 can initiate the first source shot of the fourth accessory source 1030 prior to initiating the first source shot of the third accessory source 1025. The data processing system 1200 can initiate the first source shot of the fourth accessory source 1030 at a sixth time.

The data processing system 1200 can initiate the first source shot of the first accessory source 1015 according to an accessory source initiation cycle. The accessory source initiation cycle can include predetermined source firing times for accessory source shots. Accessory source shots can include any source shots fired from accessory sources. The firing times for the accessory source initiation cycle can occur at a regular interval or regular frequency. The firing times for the accessory source initiation cycle can occur at an irregular interval or irregular frequency. The accessory source initiation cycle can have a second frequency. For example, the firing times for the accessory source initiation cycle can occur every second. The data processing system 1200 can initiate the first source shot of the second accessory source 1020 according to the accessory source initiation cycle.

The accessory source initiation cycle can be synchronized with the main source initiation cycle. For example, the accessory source initiation cycle can operate the same rate as the main source initiation cycle. The accessory source initiation cycle can operate the same time as the main source initiation cycle. The data processing system 1200 can synchronize the accessory source initiation cycle with the main source initiation cycle. The data processing system 1200 can synchronize a local clock of the first accessory source 150 with a local clock of the first main source 135. The data processing system 1200 can synchronize a local clock of the first accessory source 150 with a local clock of the second main source 140. The data processing system 1200 can synchronize a local clock of the second accessory source 160 with a local clock of the first main source 135. The data processing system 1200 can synchronize a local clock of the second accessory source 160 with a local clock of the second main source 140.

The accessory source initiation cycle can be de-synchronized with the main source initiation cycle. For example, the accessory source initiation cycle can operate at a different rate as the main source initiation cycle. The accessory source initiation cycle can operate at a different time as the main source initiation cycle. The data processing system 1200 can de-synchronize the accessory source initiation cycle with the main source initiation cycle. The data processing system 1200 can put a local clock of the first accessory source 150 out of phase with a local clock of the first main source 135. The data processing system 1200 can put a local clock of the first accessory source 150 out of phase with a local clock of the second main source 140. The data processing system 1200 can put a local clock of the second accessory source 160 out of phase with a local clock of the first main source 135. The data processing system 1200 can put a local clock of the second accessory source 160 out of phase with a local clock of the second main source 140.

The data processing system 1200 can initiate the first source shot of the first accessory source 1015 at a second frequency. The data processing system 1200 can initiate the first source shot of the second accessory source 1020 at the second frequency. The data processing system 1200 can initiate the first source shot of the third accessory source 1025 at the second frequency. The data processing system 1200 can initiate the first source shot of the fourth accessory source 1030 at the second frequency. The second frequency can be a high frequency (e.g., 1500 Hz).

Figure 11:
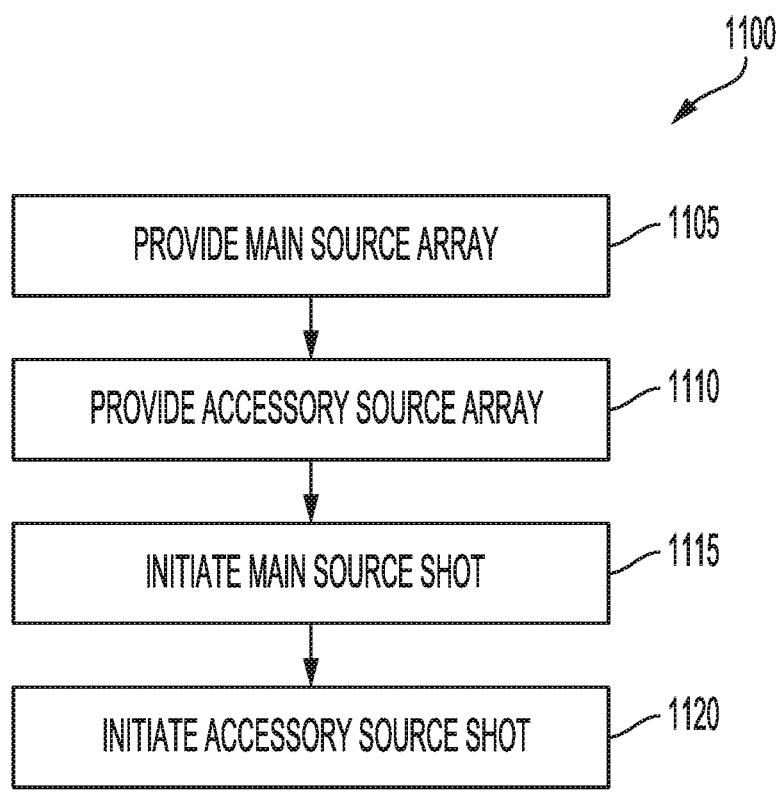
FIG. 11 illustrates a method of seismic surveying according to an example implementation.

FIG. 11 illustrates a method of seismic surveying according to an embodiment. In brief summary, the method 1100 can include providing a main source array (BLOCK 1105). The method 1100 can include providing an accessory source array (BLOCK 1110). The method 1100 can include initiating a main source shot (BLOCK 1115). The method 1100 can include initiating an accessory source shot (BLOCK 1120).

The method 1100 can include providing a main source array (BLOCK 1105). The method can include providing a main source array including a first main source. The method can include providing a main source array including a second main source.

The method 1100 can include providing an accessory source array (BLOCK 1110). The method can include providing an accessory source array including a first accessory source. The method can include providing an accessory source array including a second accessory source. The first accessory source can couple with the first main source. The second accessory source can couple with the second main source.

The method 1100 can include initiating a main source shot (BLOCK 1115). The method can include initiating, by a data processing system, a first source shot of the first main source. The method can include initiating, by the data processing system, the first source shot of the first main source according to a main source initiation cycle. The method can include initiating, by the data processing system, a first source shot of the second main source. The method can include initiating, by the data processing system, the first source shot of the second main source according to the main source initiation cycle. The method can include initiating, by the data processing system, the first source shot of the first main source at a first frequency. The method can include initiating, by the data processing system, the first source shot of the second main source at the first frequency. The method can include initiating, by the data processing system, the first source shot of the second main source at the first frequency.

The method 1100 can include initiating an accessory source shot (BLOCK 1120). The method can include initiating, by the data processing system, a first source shot of the first accessory source. The method can include initiating, by the data processing system, the first source shot of the first accessory source according to an accessory source initiation cycle. The method can include initiating, by the data processing system, a first source shot of the second accessory source. The method can include initiating, by the data processing system, the first source shot of the second accessory source according to the accessory source initiation cycle. The method can include initiating, by the data processing system, the first source shot of the first accessory source according to an accessory source initiation cycle, the accessory source initiation cycle synchronized with the main source initiation cycle. The method can include initiating, by the data processing system, the first source shot of the first accessory source according to an accessory source initiation cycle, the accessory source initiation cycle de-synchronized from the main source initiation cycle. The method can include initiating, by the data processing system, the first source shot of the second accessory source according to the accessory source initiation cycle. The method can include initiating, by the data processing system, the first source shot of the first accessory source at a second frequency. The method can include initiating, by the data processing system, the first source shot of the second accessory source at the second frequency.

Figure 12:
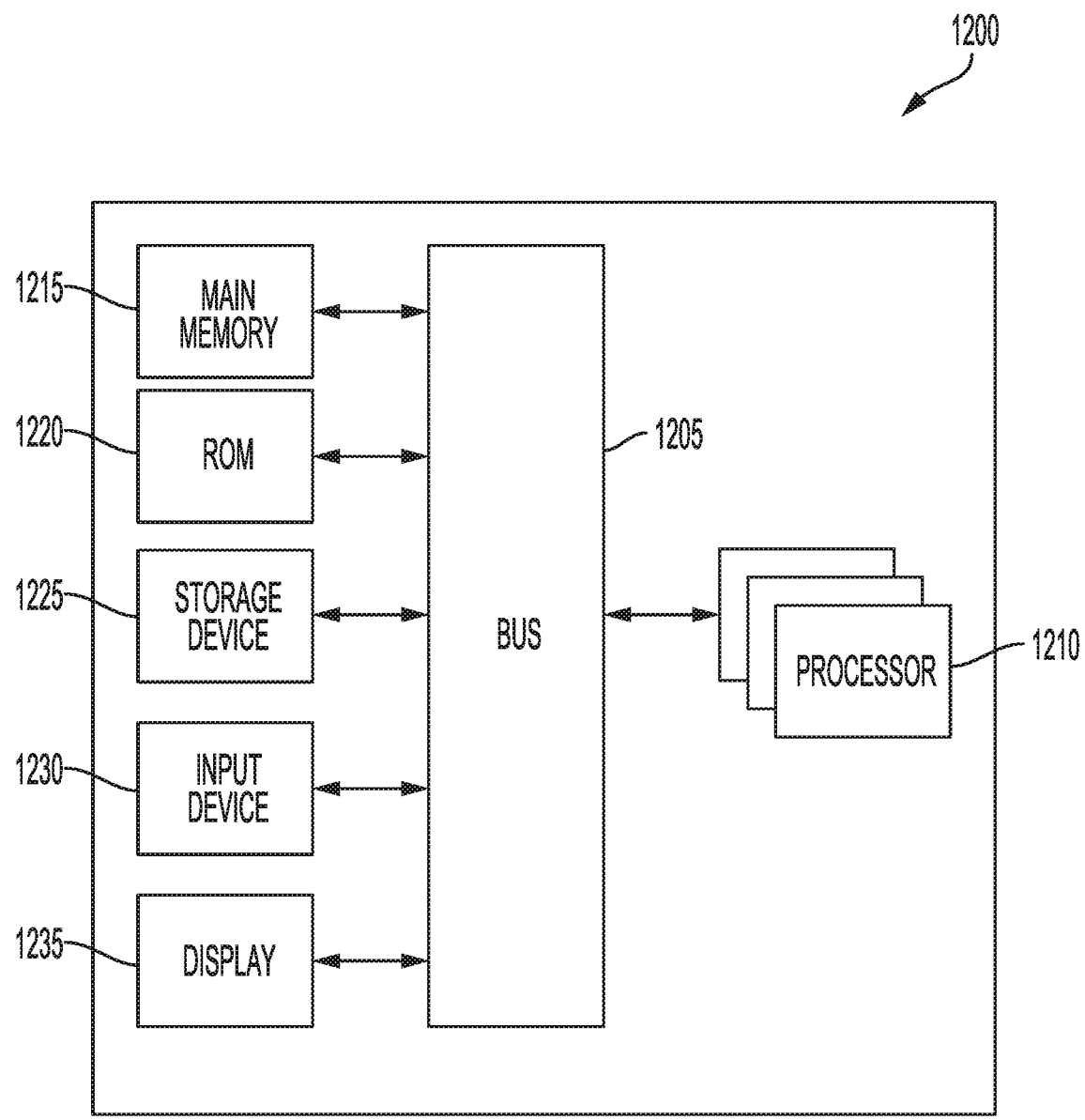
FIG. 12 depicts a block diagram of an architecture for a computing system employed to implement various elements of the systems or components depicted in FIGS. 1-11.

FIG. 12 depicts a block diagram of an architecture for a computing system employed to implement various elements of the systems or components depicted in FIGS. 1-11. FIG. 12 is a block diagram of a data processing system including a computer system 1200 in accordance with an embodiment. The data processing system, computer system or computing device 1200 can be used to implement one or more component configured to filter, translate, transform, generate, analyze, or otherwise process the data or signals depicted in FIGS. 1-11. The computing system 1200 includes a bus 1205 or other communication component for communicating information and a processor 1210 or processing circuit coupled to the bus 1205 for processing information. The computing system 1200 can also include one or more processors 1210 or processing circuits coupled to the bus for processing information. The computing system 1200 also includes main memory 1215, such as a random access memory (RAM) or other dynamic storage device, coupled to the bus 1205 for storing information, and instructions to be executed by the processor 1210. Main memory 1215 can also be used for storing seismic data, binning function data, images, reports, tuning parameters, executable code, temporary variables, or other intermediate information during execution of instructions by the processor 1210. The computing system 1200 may further include a read only memory (ROM) 1220 or other static storage device coupled to the bus 1205 for storing static information and instructions for the processor 1210. A storage device 1225, such as a solid state device, magnetic disk or optical disk, is coupled to the bus 1205 for persistently storing information and instructions.

The computing system 1200 may be coupled via the bus 1205 to a display 1235 or display device, such as a liquid crystal display, or active matrix display, for displaying information to a user. An input device 1230, such as a keyboard including alphanumeric and other keys, may be coupled to the bus 1205 for communicating information and command selections to the processor 1210. The input device 1230 can include a touch screen display 1235. The input device 1230 can also include a cursor control, such as a mouse, a trackball, or cursor direction keys, for communicating direction information and command selections to the processor 1210 and for controlling cursor movement on the display 1235.

The processes, systems and methods described herein can be implemented by the computing system 1200 in response to the processor 1210 executing an arrangement of instructions contained in main memory 1215. Such instructions can be read into main memory 1215 from another computer-readable medium, such as the storage device 1225. Execution of the arrangement of instructions contained in main memory 1215 causes the computing system 1200 to perform the illustrative processes described herein. One or more processors in a multi-processing arrangement may also be employed to execute the instructions contained in main memory 1215. In some embodiments, hard-wired circuitry may be used in place of or in combination with software instructions to effect illustrative implementations. Thus, embodiments are not limited to any specific combination of hardware circuitry and software.

Although an example computing system has been described in FIG. 12, embodiments of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, microprocessors, and any one or more processors of a digital computer. A processor can receive instructions and data from a read only memory or a random access memory or both. The elements of a computer are a processor for performing actions in accordance with instructions and one or more memory devices for storing instructions and data. A computer can include, or be operatively coupled to receive data from or transfer data to, or both, one or more mass storage devices for storing data, e.g., magnetic, magneto optical disks, or optical disks. A computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The implementations described herein can be implemented in any of numerous ways including, for example, using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the solution discussed above. The computer readable medium or media can be transportable, such that the program or programs stored thereon can be loaded onto one or more different computers or other processors to implement various aspects of the present solution as discussed above.

The terms "program" or "software" are used herein to refer to any type of computer code or set of computer-executable instructions that can be employed to program a computer or other processor to implement various aspects of embodiments as discussed above. One or more computer programs that when executed perform methods of the present solution need not reside on a single computer or processor, but may be distributed in a modular fashion amongst a number of different computers or processors to implement various aspects of the present solution.

Computer-executable instructions may be in many forms, such as program modules, executed by one or more computers or other devices. Program modules can include routines, programs, objects, components, data structures, or other components that perform particular tasks or implement particular abstract data types. The functionality of the program modules can be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The systems and methods described herein may be embodied in other specific forms without departing from the characteristics thereof. The foregoing implementations are illustrative rather than limiting of the described systems and methods.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A seismic survey system, comprising:
a main source array comprising a first main source and a second main source;
an accessory source array comprising a first accessory source and a second accessory source, the first accessory source to couple with the first main source and the second accessory source to couple with the second main source, wherein the first main source comprising a first float of the first main source, a second float of the first main source, and a third float of the first main source, wherein the second main source comprising a first float of the second main source, a second float of the second main source, and a third float of the second main source, wherein the first accessory source is coupled with the first float of the first main source and the second accessory source is coupled with the first float of the second main source, and wherein a distance between the first main source and the second main source is between 50 m and 70 m; and
a data processing system having one or more processors, the data processing system is configured to:
initiate a first source shot of the first main source at a first frequency;
initiate a first source shot of the second main source at the first frequency;
initiate a first source shot of the first accessory source at a second frequency; and
initiate a first source shot of the second accessory source at a third frequency, wherein the first frequency is different from the second and the third frequency, and wherein the second frequency and the third frequency have same range.

2. The seismic survey system of claim 1, comprising the data processing system to:
initiate the first source shot of the first main source according to a main source initiation cycle; and
initiate the first source shot of the second main source according to the main source initiation cycle.

3. The seismic survey system of claim 1, comprising the data processing system to:
initiate the first source shot of the first accessory source according to an accessory source initiation cycle; and
initiate the first source shot of the second accessory source according to the accessory source initiation cycle.

4. The seismic survey system of claim 1, comprising the data processing system to:
initiate the first source shot of the first main source according to a main source initiation cycle;
initiate the first source shot of the second main source according to the main source initiation cycle;
initiate the first source shot of the first accessory source according to an accessory source initiation cycle, the accessory source initiation cycle synchronized with the main source initiation cycle; and
initiate the first source shot of the second accessory source according to the accessory source initiation cycle.

5. The seismic survey system of claim 1, comprising the data processing system to:
initiate the first source shot of the first main source according to a main source initiation cycle;
initiate the first source shot of the second main source according to the main source initiation cycle;
initiate the first source shot of the first accessory source according to an accessory source initiation cycle, the accessory source initiation cycle de-synchronized from the main source initiation cycle; and
initiate the first source shot of the second accessory source according to the accessory source initiation cycle.

6. The seismic survey system of claim 1, comprising:
the first main source comprising a first float of the first main source, a second float of the first main source, and a third float of the first main source;
the second main source comprising a first float of the second main source, a second float of the second main source, and a third float of the second main source;
the first accessory source to couple with the first float of the first main source;
the second accessory source to couple with the first float of the second main source;
a first lateral cable to couple with a first diverter and with the first main source;
a second lateral cable to couple with a second diverter and with the second main source;
the accessory source array comprising a third accessory source and a fourth accessory source;
the third accessory source to couple with the first lateral cable; and
the fourth accessory source to couple with the second lateral cable.

7. The seismic survey system of claim 1, comprising:
the first main source comprising a first float of the first main source, a second float of the first main source, and a third float of the first main source;
the second main source comprising a first float of the second main source, a second float of the second main source, and a third float of the second main source;
the first accessory source to couple with the first float of the first main source;
the second accessory source to couple with the first float of the second main source;
a first lateral cable to couple with a first diverter and with the first main source;
a second lateral cable to couple with a second diverter and with the second main source;
the accessory source array comprising a third accessory source and a fourth accessory source;
the third accessory source to couple with the first lateral cable;
the fourth accessory source to couple with the second lateral cable; and
the data processing system to:
initiate the first source shot of the first accessory source at a second frequency;
initiate the first source shot of the second accessory source at the second frequency;
initiate a first source shot of the third accessory source at the second frequency; and
initiate a first source shot of the fourth accessory source at the second frequency.

8. The seismic survey system of claim 1, comprising:
the accessory source array comprising a third accessory source and a fourth accessory source; and
the data processing system to:
initiate the first source shot of the first accessory source at a second frequency;
initiate the first source shot of the second accessory source at the second frequency;
initiate a first source shot of the third accessory source at the second frequency; and
initiate a first source shot of the fourth accessory source at the second frequency.

9. The seismic survey system of claim 1, comprising the data processing system to:

initiate the first source shot of the first main source at a first time;
initiate the first source shot of the second main source at a second time;
initiate the first source shot of the first accessory source at a third time; and
initiate the first source shot of the second accessory source at a fourth time.

10. The seismic survey system of claim 1, comprising the data processing system to:
initiate the first source shot of the first main source at a first time;
initiate the first source shot of the first accessory source at a second time, the second time subsequent to the first time;
initiate the first source shot of the second main source at a third time, the third time subsequent to the second time; and
initiate the first source shot of the second accessory source at a fourth time, the fourth time subsequent to the third time.

11. The seismic survey system of claim 1, comprising:
the accessory source array comprising a third accessory source and a fourth accessory source; and
the data processing system to:
initiate the first source shot of the first main source at a first time;
initiate the first source shot of the second main source at a second time;
initiate the first source shot of the first accessory source at a third time;
initiate the first source shot of the second accessory source at a fourth time;
initiate the first source shot of the third accessory source at a fifth time; and
initiate the first source shot of the fourth accessory source at a sixth time.

12. The seismic survey system of claim 1, comprising the data processing system to:
initiate the first source shot of the first main source and the first source shot of the second main source according to a main source initiation cycle, the main source initiation cycle having a first frequency; and
initiate the first source shot of the first accessory source and the first source shot of the second accessory source according to an accessory source initiation cycle, the accessory source initiation cycle having a second frequency.

13. A seismic survey method, comprising:
providing a main source array comprising a first main source and a second main source;
providing an accessory source array comprising a first accessory source and a second accessory source, the first accessory source to couple with the first main source and the second accessory source to couple with the second main source, wherein the first main source comprising a first float of the first main source, a second float of the first main source, and a third float of the first main source, wherein the second main source comprising a first float of the second main source, a second float of the second main source, and a third float of the second main source, wherein the first accessory source is coupled with the first float of the first main source and the second accessory source is coupled with the first float of the second main source, and wherein a distance between the first main source and the second main source is between 50 m and 70 m;
initiating, by a data processing system, a first source shot of the first main source at a first frequency;
initiating, by the data processing system, a first source shot of the second main source at the first frequency;
initiating, by the data processing system, a first source shot of the first accessory source at a second frequency; and
initiating, by the data processing system, a first source shot of the second accessory source at a third frequency, wherein the first frequency is different from the second and the third frequency, and wherein the second frequency and the third frequency have a same range.

14. The seismic survey method of claim 13, comprising:
initiating, by the data processing system, the first source shot of the first main source according to a main source initiation cycle; and
initiating, by the data processing system, the first source shot of the second main source according to the main source initiation cycle.

15. The seismic survey method of claim 13, comprising:
initiating, by the data processing system, the first source shot of the first accessory source according to an accessory source initiation cycle; and
initiating, by the data processing system, the first source shot of the second accessory source according to the accessory source initiation cycle.

16. The seismic survey method of claim 13, comprising:
initiating, by the data processing system, the first source shot of the first main source according to a main source initiation cycle;
initiating, by the data processing system, the first source shot of the second main source according to the main source initiation cycle;
initiating, by the data processing system, the first source shot of the first accessory source according to an accessory source initiation cycle, the accessory source initiation cycle synchronized with the main source initiation cycle; and
initiating the first source shot of the second accessory source according to the accessory source initiation cycle.

17. The seismic survey method of claim 13, comprising:
initiating, by the data processing system, the first source shot of the first main source according to a main source initiation cycle;
initiating, by the data processing system, the first source shot of the second main source according to the main source initiation cycle;
initiating, by the data processing system, the first source shot of the first accessory source according to an accessory source initiation cycle, the accessory source initiation cycle de-synchronized from the main source initiation cycle; and
initiating, by the data processing system, the first source shot of the second accessory source according to the accessory source initiation cycle.

* * * * *